United States Patent
Woo et al.

(10) Patent No.: US 10,616,724 B2
(45) Date of Patent: Apr. 7, 2020

(54) METHOD, DEVICE, AND NON-TRANSITORY COMPUTER-READABLE RECORDING MEDIUM FOR SUPPORTING RELAY BROADCASTING USING MOBILE DEVICE

(71) Applicant: 39degrees C Inc., Seoul (KR)

(72) Inventors: Seung Won Woo, Seoul (KR); Hyun Goo Park, Seoul (KR)

(73) Assignee: 39DEGREES C INC., Seoul (KR)

( * ) Notice: Subject to any disclaimer, the term of this patent is extended or adjusted under 35 U.S.C. 154(b) by 0 days.

(21) Appl. No.: 16/003,688

(22) Filed: Jun. 8, 2018

(65) Prior Publication Data

US 2018/0332439 A1 Nov. 15, 2018

Related U.S. Application Data

(63) Continuation-in-part of application No. 15/333,940, filed on Oct. 25, 2016, now Pat. No. 10,020,903.

(30) Foreign Application Priority Data

| Nov. 19, 2015 | (KR) | 10-2015-0162538 |
| Mar. 15, 2018 | (KR) | 10-2018-0030414 |

(51) Int. Cl.
| H04W 4/06 | (2009.01) |
| H04W 88/04 | (2009.01) |
| H04W 76/14 | (2018.01) |
| H04L 12/18 | (2006.01) |
| G11B 27/034 | (2006.01) |
| G11B 27/031 | (2006.01) |

(52) U.S. Cl.
CPC ............ *H04W 4/06* (2013.01); *G11B 27/031* (2013.01); *G11B 27/034* (2013.01); *H04L 12/189* (2013.01); *H04L 12/1877* (2013.01); *H04W 76/14* (2018.02); *H04W 88/04* (2013.01)

(58) Field of Classification Search
None
See application file for complete search history.

(56) References Cited

U.S. PATENT DOCUMENTS

| 5,953,050 A | 9/1999 | Kamata et al. |
| 7,456,875 B2 | 11/2008 | Kashiwa |
| 9,723,193 B2 | 8/2017 | Takahashi |
| 10,171,794 B2 | 1/2019 | Matsunobu et al. |
| 10,200,597 B2 | 2/2019 | Choi et al. |
| 2005/0130587 A1 | 6/2005 | Suda et al. |
| 2007/0171818 A1 | 7/2007 | Shoji et al. |

(Continued)

FOREIGN PATENT DOCUMENTS

| EP | 2328287 A2 * | 6/2011 | ............ H04H 20/06 |
| JP | 11-133936 A | 5/1999 | |

(Continued)

*Primary Examiner* — Anh Ngoc M Nguyen
(74) *Attorney, Agent, or Firm* — Novick, Kim & Lee, PLLC; Jae Youn Kim

(57) ABSTRACT

Provided are a method, device, and non-transitory computer-readable recording medium for supporting relay broadcasting using a mobile device. It is possible to reduce a computing load of a relay device by distributing a computing load required to produce relay broadcasting content to a plurality of photographer devices and thus widen the range of photographer devices that may participate in relay broadcasting.

5 Claims, 18 Drawing Sheets

(56) References Cited

U.S. PATENT DOCUMENTS

| | | | |
|---|---|---|---|
| 2008/0081553 A1 | 4/2008 | Kanda | |
| 2009/0015659 A1* | 1/2009 | Choi | H04N 7/152 348/14.09 |
| 2009/0073918 A1 | 3/2009 | Conforto et al. | |
| 2010/0099461 A1* | 4/2010 | Rahfaldt | H04M 1/72541 455/557 |
| 2013/0152118 A1* | 6/2013 | Oh | H04N 21/44008 725/19 |
| 2014/0267749 A1 | 9/2014 | Frigon | |
| 2015/0036578 A1 | 2/2015 | Wu et al. | |
| 2015/0280807 A1 | 10/2015 | Ode et al. | |
| 2017/0018182 A1 | 1/2017 | Makled et al. | |

FOREIGN PATENT DOCUMENTS

| | | |
|---|---|---|
| JP | 2003-274358 A | 9/2003 |
| JP | 2009-267999 A | 11/2009 |
| JP | 2013-026787 A | 2/2013 |
| JP | 2013-162348 A | 8/2013 |
| JP | 2013162348 A | 8/2013 |
| JP | 2016-213808 A | 12/2016 |
| KR | 10-0523761 B1 | 10/2005 |
| KR | 10-2008-0043492 A | 5/2008 |
| KR | 10-2014-0093557 A | 7/2014 |

* cited by examiner

METHOD, DEVICE, AND NON-TRANSITORY COMPUTER-READABLE RECORDING MEDIUM FOR SUPPORTING RELAY BROADCASTING USING MOBILE DEVICE

CROSS-REFERENCE TO RELATED APPLICATION

This application is a continuation-in-part of U.S. patent application Ser. No. 15/333,940 filed on Oct. 25, 2016, and claims the priority of Korean Patent Application No. 10-2015-0162538, filed on Nov. 19, 2015, and Korean Patent Application No. 10-2018-0030414, filed on Mar. 15, 2018, in the Korean Intellectual Property Office, the disclosures of which are incorporated herein in their entirety by reference.

BACKGROUND

1. Field

One or more embodiments relate to a method, device, and non-transitory computer-readable recording medium for supporting relay broadcasting using a mobile device.

2. Description of the Related Art

Basically, many hardware resources (e.g., a central processing unit (CPU), a memory, etc.) are required to process video signals or audio signals. Thus, expensive high-end equipment is required to process and edit video signals and audio signals that are input through several channels in real time to produce relay broadcasting signals. Recently, as broadcasting communication technology is developed, such equipment has increased performance and has been popularized. However, resolution and quality of video signals and audio signals to be processed by the equipment also have increased. Thus, it is, in fact, difficult to process and edit a plurality of video signals and audio signals without expensive high-end equipment.

In particular, general users may generate their own videos or audios using cameras or microphones included in their mobile devices such as smartphones or tablets. However, such mobile devices may perform only simple operations (e.g., an upload or download) on video signals or audio signals generated by the users due to limitations in performance. Such mobile devices have difficulty producing relay broadcasting content obtained by combining several video signals and audio signals. Thus, there are limitations in using videos and audios that may be generated using the mobile devices in various ways.

SUMMARY

One or more embodiments are intended to distribute a computing load required to produce relay broadcasting content for video data or audio data received from a plurality of mobile devices by receiving first sampling video data and first sampling audio data of first video data and first audio data, respectively, generated by a first photographer device, receiving second sampling video data and second sampling audio data of second video data and second sampling audio data, respectively, generated by a second photographer device, providing at least one of the first sampling video data, the first sampling audio data, the second sampling video data, and the second sampling audio data to a repeater through a relay device, generating editing data for editing relay broadcasting content including at least one of the first sampling video data, the first sampling audio data, the second sampling video data, and the second sampling audio data with reference to an input for editing at least one of the first sampling video data, the first sampling audio data, the second sampling video data, and the second sampling audio data, and adaptively determining quality of at least one of the first sampling video data, the first sampling audio data, the second sampling video data, and the second sampling audio data on the basis of the editing input.

Additional aspects will be set forth in part in the description which follows and, in part, will be apparent from the description, or may be learned by practice of the presented embodiments.

According to one or more embodiments, a method of supporting relay broadcasting using a mobile device, which is performed by a relay device, includes receiving first sampling video data and first sampling audio data of first video data and first audio data, respectively, generated by a first photographer device and receiving second sampling video data and second sampling audio data of second video data and second audio data, respectively, generated by a second photographer device; providing at least one of the first sampling video data, the first sampling audio data, the second sampling video data, and the second sampling audio data to the relay device; and generating data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein quality of at least one of the first sampling video data, the first sampling audio data, the second sampling video data, and the second sampling audio data, which is transmitted from the first photographer device or the second photographer device and then received by the relay device, is adaptively determined based on the editing input; a control signal for adaptively determining the quality is transmitted from the relay device to the first photographer device or the second photographer device; quality of data to be edited is determined to be higher than quality of data not to be edited; and quality of specific data to be edited is determined to be higher than quality of the specific data before or after it is determined that the data is to be edited.

According to one or more embodiments, a device for supporting relay broadcasting using a mobile device includes: a data receiver configured to receive first sampling video data and first sampling audio data of first video data and first audio data, respectively, generated by a first photographer device and receive second sampling video data and second sampling audio data of second video data and second audio data, respectively, generated by a second photographer device; and a relay broadcasting content editor configured to provide at least one of the first sampling video data, the first sampling audio data, the second sampling video data, and the second sampling audio data to a relay device and generate data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein quality of at least one of the first sampling video data, the first sampling audio data, the second sampling video data, and the second sampling audio data, which is transmitted from the first photographer device or the second photographer device and then received from the relay device, is adaptively determined based on the editing input; a control signal for adaptively determining the quality is transmitted from the relay device to the first photographer device or the second photographer device; quality of data to be edited is determined to be higher than quality of data not to be edited; and quality of specific data to be edited is determined to be higher than quality of the specific data before or after it is determined that the data is to be edited.

In addition, other methods and devices for implementing the present invention and a computer-readable recording medium for recording a computer program for executing the methods are further provided.

One or more embodiments are directed to transmitting video data and audio data captured by multiple devices to a media platform in real time without delay so that the media platform may reproduce the video data and the audio data in real time.

One or more embodiments are directed to transmitting a video signal captured by a subdevice among multiple devices to a main device without delay and without using a router.

One or more embodiments are directed to displaying video signals captured by a main device and a subdevice on a display region of the main device in real time.

One or more embodiments are directed to reproducing video data and audio data in real time on a media platform by relaying video data and audio data captured by a main device in real time to the media platform while continuously capturing a moving picture by turning on a camera of the main device, even when video data cannot be received from a subdevice due to an error occurring in a communication network.

Additional aspects will be set forth in part in the description which follows and, in part, will be apparent from the description, or may be learned by practice of the presented embodiments.

According to an aspect of an embodiment, an apparatus for processing an image includes a shooting unit configured to capture a moving picture including video data and audio data of a subject at a certain location; a receiver configured to receive video data of a moving picture of the subject except audio data of the moving picture, the moving picture being captured by at least one subdevice at the same shooting start time as the shooting unit and at one or more locations different from a shooting location of the shooting unit; a layer generator configured to generate a first layer and at least one second layer to play and display on a screen a plurality of pieces of video data including the video data captured by the shooting unit and at least one piece of video data received by the receiver, wherein the first layer is configured to transmit one of the plurality of pieces of video data to the screen, and the at least one second layer is configured to transmit the plurality of pieces of video data to a part of the screen; a display controller configured to play and display the first layer and the at least one second layer to be overlaid with each other on one screen by hierarchical combination; and a transmitter configured to transmit the video data played and displayed on the first layer and the audio data included in the moving picture captured by the shooting unit to the outside.

The apparatus may further include a layer switcher configured to switch the second layer to the first layer and switch the first layer before being switched to the second layer when a screen switch event signal regarding one of the at least one second layer is received.

The capturing of the moving picture by the shooting unit may be continuously performed.

According to an aspect of another embodiment, a method of processing an image includes capturing a moving picture including video data and audio data of a subject at a certain location, which is performed by a shooting unit; receiving video data of a moving picture of the subject except audio data of the moving picture, the moving picture being captured by at least one subdevice at the same shooting start time as the shooting unit and one or more locations different from a shooting location of the shooting unit, which is performed by a receiver; generating a first layer and at least one second layer to play and display on the screen a plurality of pieces of video data including the video data captured by the shooting unit and at least one piece of video data received by the receiver, which is performed by a layer generator, wherein the first layer is configured to transmit one of the plurality of pieces of video data to the screen, and the at least one second layer is configured to transmit the plurality of pieces of video data to a part of the screen; playing and displaying the first layer and the at least one second layer to be overlaid with each other on one screen through hierarchical combining, which is performed by a display controller; and transmitting the video data played and displayed on the first layer and the audio data included in the moving picture captured by the shooting unit to the outside, which is performed by a transmitter.

The method may further include switching the second layer to the first layer and switching the first layer which has yet to be switched to the second layer, which is performed by a layer switcher, when a screen switch event signal regarding one of the at least one second layer is received.

The method may further include continuously performing the capturing of the moving picture by the shooting unit.

According to one or more embodiments, there are provided other methods, systems, and a computer program configured to perform the methods.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
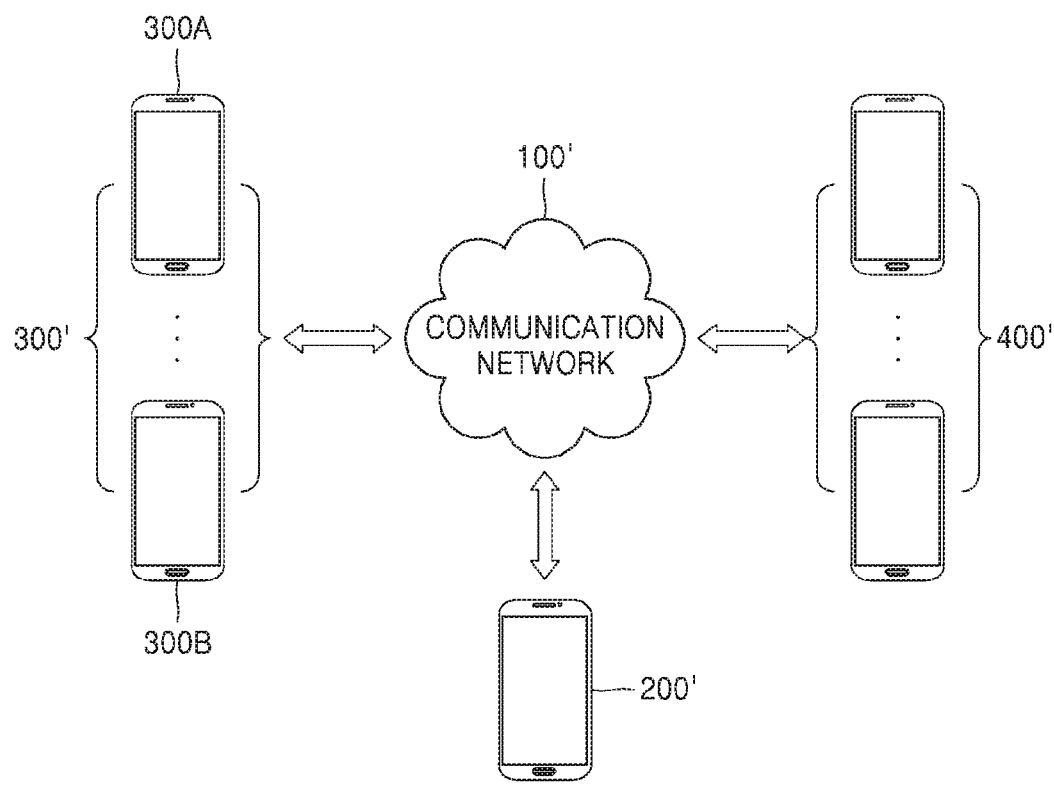
FIG. 1 is a diagram illustrating an entire configuration of a system for implementing the present invention.

Reference will now be made in detail to embodiments, examples of which are illustrated in the accompanying drawings, wherein like reference numerals refer to like elements throughout. In this regard, the present embodiments may have different forms and is not to be construed as being limited to the descriptions set forth herein. Accordingly, the embodiments are merely described below with reference to the figures to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following detailed description refers to the accompanying drawings that illustrate exemplary embodiments consistent with the present invention. These embodiments will be described in sufficient detail to enable those skilled in the art to practice the present invention. It should be understood that the various embodiments, although different, are not necessarily mutually exclusive. For example, a particular feature, structure or characteristic described herein in connection with one embodiment may be implemented within other embodiments without departing from the spirit and scope of the present invention. In addition, it should be understood that the location or arrangement of individual elements within each embodiment disclosed may be modified without departing from the spirit and scope of the present invention. The following detailed description is, therefore, not to be taken in a limiting sense, and when appropriately described, the scope of the present invention is defined only by the appended claims, appropriately interpreted along with the full range of equivalents to which the claims are entitled. In the drawings, like numerals refer to the same or similar elements throughout several views.

Hereinafter, various embodiments of the present invention will be described in more detail with reference to the accompanying drawings so that a person skilled in the art can easily practice the invention.

Entire configuration of system.

FIG. 1 is a diagram illustrating an entire configuration of a system for implementing the present invention.

As shown in FIG. 1, a system according to an embodiment of the present invention may include a communication network 100', a relay device 200', a photographer device 300', and a viewer device 400'.

According to an embodiment of the present invention, the communication network 100' may be configured without regard to a communication aspect such as wired communication or wireless communication and may include various communication networks such as a local area network (LAN), a metropolitan area network (MAN), a wide area network (WAN), etc. For example, the communication network 100' used herein may include a well-known short-range wireless communication network such as Wi-Fi, Wi-Fi Direct, LTE Direct, and Bluetooth. However, the communication network 100' may at least partially include, but is not limited to, a well-known wired or wireless data communication network, a well-known telephone network, or a well-known wired or wireless television communication network.

Next, the relay device 200' according to an embodiment of the present invention may receive first sampling video data and first sampling audio data of first video data and first audio data, respectively, generated by a first photographer device 300A, receive second sampling video data and second sampling audio data of second video data and second audio data, respectively, generated by a second photographer device 300B, provide at least one of the first sampling video data, the first sampling audio data, the second sampling video data, and the second sampling audio data to a repeater through a relay device 200', generate editing data for editing relay broadcasting content including at least one of the first sampling video data, the first sampling audio data, the second sampling video data, and the second sampling audio data with reference to an input for editing at least one of the first sampling video data, the first sampling audio data, the second sampling video data, and the second sampling audio data, and adaptively determine quality of at least one of the first sampling video data, the first sampling audio data, the second sampling video data, and the second sampling audio data on the basis of the editing input, thus performing a function of distributing a computing load required to produce relay broadcasting content of video data or audio data received from a plurality of mobile devices.

According to an embodiment of the present invention, a digital device equipped with a memory unit and a microprocessor and having computing capability, such as a smartphone, a tablet, a desktop computer, a notebook computer, a workstation, a personal digital assistant (PDA), a mobile phone, etc. may be adopted as the relay device 200' according to the present invention.

A configuration and function of the relay device 200' according to the present invention will be described in detail through the following detailed description.

Next, according to an embodiment of the present invention, the photographer device 300' is a digital device including a function of transmitting video data captured or audio data recorded by a photographer to the relay device 200'. For example, a digital device equipped with a memory unit and a microprocessor and having computing capability, such as a smartphone, a tablet, a desktop computer, a notebook computer, a workstation, a PDA, a mobile phone, etc. may be adopted as the photographer device 300' according to the present invention.

Next, according to an embodiment of the present invention, the viewer device 400' is a digital device including a function of receiving video data, audio data, and editing data included in relay broadcasting content transmitted from the relay device 200' and playing the relay broadcasting content using the video data, the audio data, and the editing data. For example, a digital device equipped with a memory unit and a microprocessor and having computing capability, such as a smartphone, a tablet, a desktop computer, a notebook computer, a workstation, a PDA, a web pad, a mobile phone, etc. may be adopted as the viewer device 400' according to the present invention.

In particular, the relay device 200', the photographer device 300', and the viewer device 400' may include a dedicated application (not shown) that supports production of relay broadcasting content. Such an application may be downloaded from an external service providing server (not shown).

In this specification, unique functions that may be performed by the relay device 200', the photographer device 300', and the viewer device 400' are described. However, it should be noted that the relay device 200', the photographer device 300', and the viewer device 400' do not necessarily perform only the unique functions. That is, a mobile device may be any of the relay device 200', the photographer device 300', and the viewer device 400' depending on its usage. For example, when a user performs capturing or recording using his/her mobile device, the mobile device may be the photographer device 300'. When the user performs repeating using his/her mobile device, the mobile device may be the relay device 200'. When the user performs viewing using his/her mobile device, the mobile device may be the viewer device 400'.

Configuration of Relay Device

An internal configuration and functions of main elements of the relay device 200' will be described below.

Figure 2:
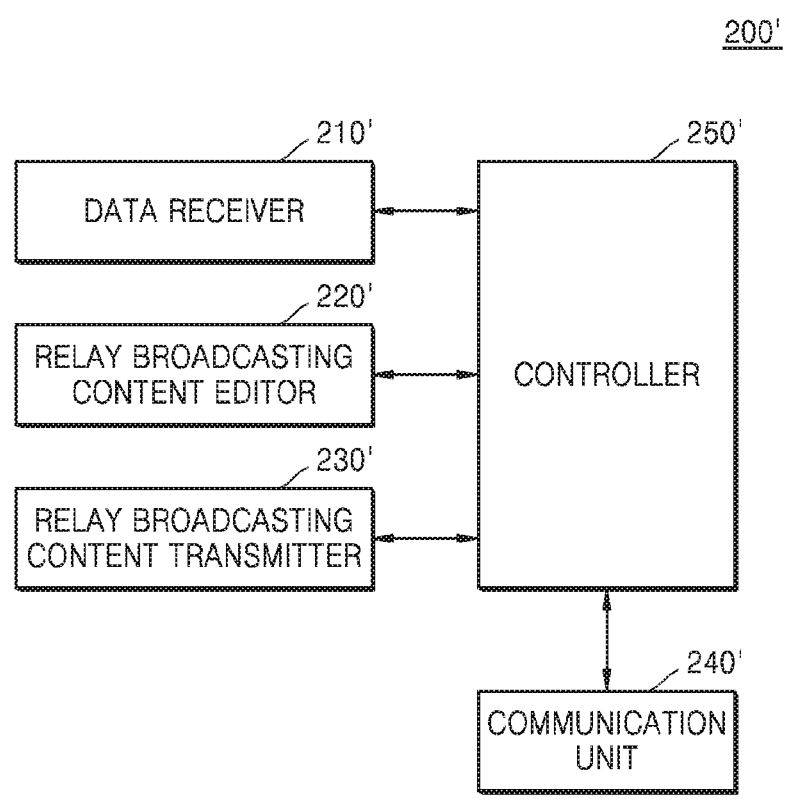
FIG. 2 is a diagram illustrating an internal configuration of a relay device according to an embodiment of the present invention.

FIG. 2 is a diagram illustrating an internal configuration of the relay device 200' according to an embodiment of the present invention.

Referring to FIG. 2, the relay device 200' according to an embodiment of the present invention may include a data receiver 210', a relay broadcasting content editor 220', a relay broadcasting content transmitter 230', a communication unit 240', and a controller 250'. According to an embodiment of the present invention, each of the data receiver 210', the relay broadcasting content editor 220', the relay broadcasting content transmitter 230', the communication unit 240', and the controller 250' may have a program module for communicating with the relay device 200' as at least a part thereof. The program module may be an operating system, an application program module, or another program module, which may be included in the relay device 200' and physically stored in various well-known memory devices. Also, the program module may be stored in a remote memory device that may communicate with the relay device 200'. The program module may encompass, but is not limited to, a routine, a subroutine, a program, an object, a component, a data structure, etc. for performing a specific task or executing a specific type of abstract data which will be described according to the present invention.

First, according to an embodiment of the present invention, the data receiver 210' may receive video data and audio data from at least one photographer device 300' that may communicate with the relay device 200'. In detail, according to an embodiment of the present invention, the data receiver 210' may function to receive first sampling video data and first sampling audio data of first video data and first audio data, respectively, generated by a first photographer device 300A and receive second sampling video data and second sampling audio data of second video data and second audio data, respectively, generated by a second photographer device 300B.

In more detail, according to an embodiment of the present invention, a plurality of first audio frames divided from the first audio data are included in the first sampling audio data, and a plurality of first video frames sampled from the first video data and synchronized with the plurality of first audio frames may be included in the first sampling video data. Also, according to an embodiment of the present invention, a plurality of second audio frames divided from the second audio data are included in the second sampling audio data, and a plurality of second video frames sampled from the second video data and synchronized with the plurality of second audio frames may be included in the second sampling video data.

Figure 3:
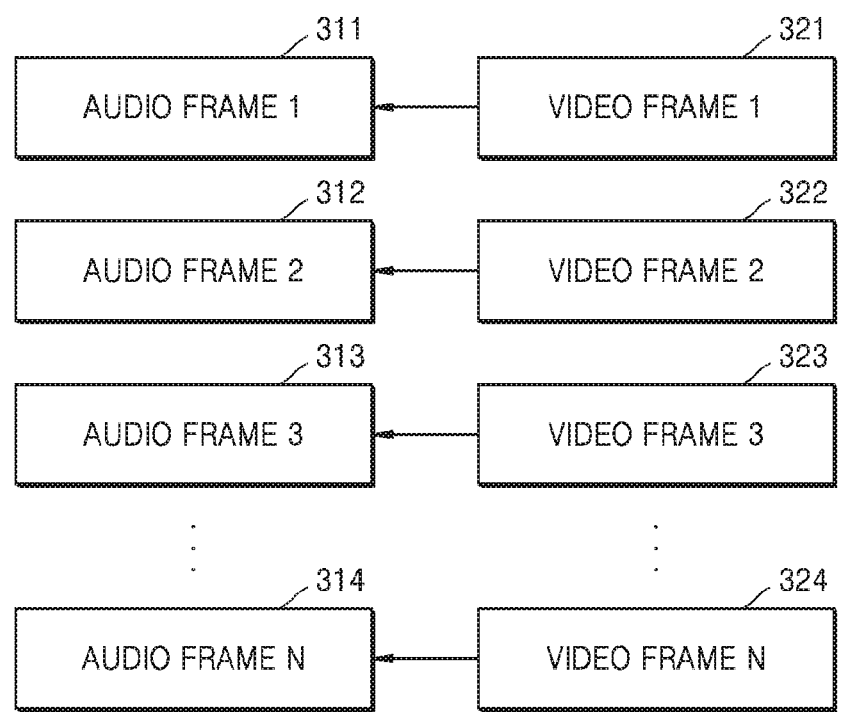
FIG. 3 is a diagram illustrating a configuration in which video data and audio data are sampled in a photographer device according to an embodiment of the present invention.

FIG. 3 is a diagram illustrating a configuration in which video data and audio data are sampled in a photographer device according to an embodiment of the present invention.

Referring to FIG. 3, audio data recorded by a microphone included in the photographer device 300' may be divided into a plurality of sections (hereinafter referred to as "audio frames") 311 to 314 at a certain sampling rate to form sampling audio data. A plurality of video frames 321 to 324 captured at the same sampling rate as described above from video data taken with a camera included in the photographer device 300' may form sampling video data. The plurality of audio frames may be synchronized with, and thus correspond to, the plurality of video frames.

With continuing reference to FIG. 3, when sampling is performed on the video data and the audio data N times per second, N video frames and N audio frames may be included in the sampling video data and the sampling audio data, respectively, while the video frames and the audio frames are synchronized with, and thus correspond to, each other during one second.

As computing performance of the photographer device 300' becomes insufficient or traffic of the communication network 100' increases, it may become difficult for the photographer device 300' to perform sampling (i.e., capturing) on video data at a predetermined sampling rate in real time. In this case, the photographer device 300' according to an embodiment of the present invention may reduce computing resources required for the sampling by overlapping at least two video frames which are included in the sampling video data (e.g., using an $(N-1)^{th}$ video frame that was already captured as an Nth video frame, rather than separately capturing video data for the Nth video frame).

Also, according to an embodiment of the present invention, each of the plurality of video frames forming the sampling video data may be a compressed image that is generated by compressing an image captured from original video data in a predetermined compression method. According to an embodiment of the present invention, the above compression process may be performed by the photographer device 300'. Accordingly, according to the present invention, it is possible to reduce a load of a communication network by decreasing a size of the sampling video data and also to concentrate computing resources of the relay device 200' on real-time editing by passing a computing load required to compress an image to the photographer device 300'.

Next, according to an embodiment of the present invention, the relay broadcasting content editor 220' may function to provide the first sampling video data, the first sampling audio data, the second sampling video data, and the second sampling audio data to a repeater through the relay device 200'. Accordingly, according to an embodiment of the present invention, a repeater that performs editing using the relay device 200' may receive the first sampling video data, the first sampling audio data, the second sampling video data, and the second sampling audio data in the form of a preview screen, check video taken or audio recorded by each of the first photographer device 300A and the second photographer device 300B in real time, and edit the relay broadcasting content by entering a certain editing input on the basis of the previewed video or audio.

Also, according to an embodiment of the present invention, the relay broadcasting content editor 220' may function to adaptively determine quality of at least one of the first sampling video data and the first sampling audio data received from the first photographer device 300A and the second sampling video data and the second sampling audio data received from the second photographer device 300B on the basis of an editing input of a repeater (that is, an editor) that is entered through the relay device 200'. Here, according to an embodiment of the present invention, the quality of the data may include a sampling rate, a resolution, a size, etc. of the data.

For example, according to an embodiment of the present invention, a sampling rate of first sampling video data to be edited by the repeater may be determined to be higher than that of second sampling video data not to be edited. As another example, according to an embodiment of the present invention, the resolution of the first sampling video data to be edited by the repeater may be determined to be higher than that of the first sampling video data before or after it is determined that the first sampling video data is to be edited.

Accordingly, according to an embodiment of the present invention, it is possible to transmit only specific video data or specific audio data to be edited by the repeater at a higher quality than other video data or other audio data not to be edited among pieces of video data and audio data received from a plurality of photographer devices 300', and it is also possible to significantly reduce data transmission loads between the relay device 200' and the plurality of photographer devices 300' while enabling relay broadcasting content having a sufficiently high quality to be produced.

According to an embodiment of the present invention, a control signal for adaptively determining the quality of the sampling video data or the sampling audio data may be transmitted from the relay device 200' to the first photographer device 300A or the second photographer device 300B.

Next, according to an embodiment of the present invention, the relay broadcasting content editor 220' may function to edit relay broadcasting content including the first sampling video data, the first sampling audio data, the second sampling video data, or the second sampling audio data received from the first photographer device 300A or the second photographer device 300B, on the basis of the editing input from a repeater.

In detail, according to an embodiment of the present invention, the relay broadcasting content editor 220' may function to generate data for editing the relay broadcasting content including the first sampling video data, the first sampling audio data, the second sampling video data, or the second sampling audio data with reference to an editing input from a user (that is, a repeater). For example, the editing data may include information regarding conversion between the first sampling video data and the second sampling video data, information regarding combination between at least one of the first sampling video data and the second sampling video data and at least one of the first sampling audio data and the second sampling audio data, information regarding subtitles combined with the first sampling video data or the second sampling video data, information regarding a graphic element combined with a specific area of the first sampling video data or the second sampling video data, information regarding a sound effect or relayed voice combined with the first sampling audio data or the second sampling audio data, etc.

Also, according to an embodiment of the present invention, the data for editing the relay broadcasting content may include text-based data having a format such as XML, JSON, etc.

Next, according to an embodiment of the present invention, the relay broadcasting content transmitter 230' may function to transmit data included in the relay broadcasting content among the first sampling video data, the first sampling audio data, the second sampling video data, and the second sampling audio data received from a plurality of photographer devices 300A and 300B and data for editing the data included in the relay broadcasting content to the viewer device 400' or a storage (not shown).

According to an embodiment of the present invention, when the sampling vide data or sampling audio data included in the relay broadcasting content and the editing data are received, the viewer device 400' may play the sampling video data or the sampling audio data included in the relay broadcasting content using the aforementioned dedicated application with reference to the editing data. Thus, the relay broadcasting content intended by the relay device 200' may be provided to a viewer.

Figure 4:
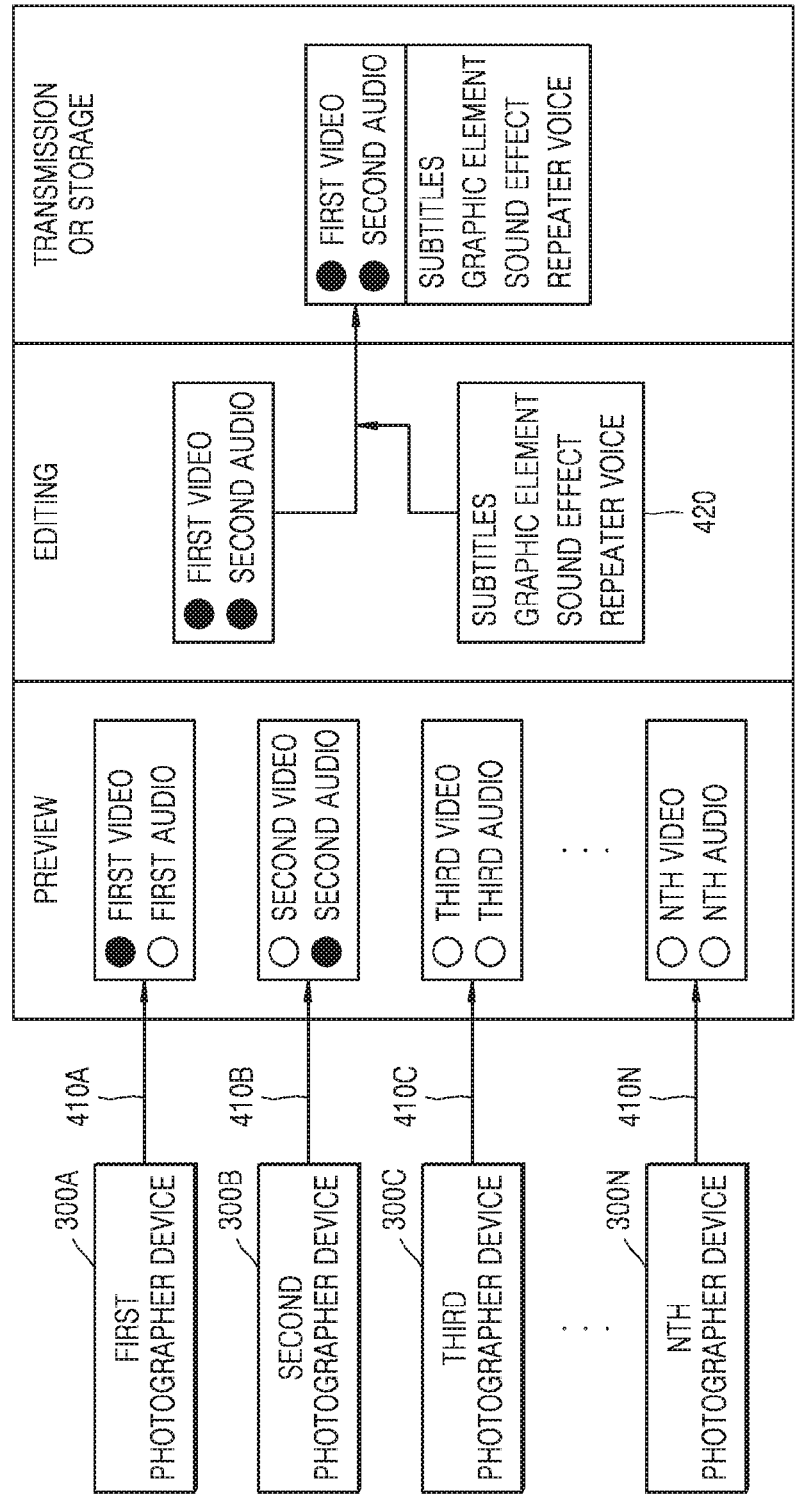
FIG. 4 is a diagram illustrating a configuration in which relay broadcasting content is produced using sampling video data and sampling audio data received from a plurality of photographer devices according to an embodiment of the present invention.

FIG. 4 is a diagram illustrating a configuration in which relay broadcasting content is produced using sampling video data and sampling audio data received from a plurality of photographer devices according to an embodiment of the present invention.

Referring to FIG. 4, it may be assumed that data to be edited by the relay device 200' includes first sampling video data and second sampling audio data. In this case, according to an embodiment of the present invention, when a control signal based on an editing input is received, the first photographer device 300A may increase a sampling rate for the first video data (that is, video data included in the relay broadcasting content). Thus, quality of first sampling video data 410A received from the first photographer device 300A may increase to a level (e.g., 70% to 100%) similar to that of original data. On the other hand, according to an embodiment of the present invention, second to nth photographer devices 300B to 300N, which are the other devices that have received the control signal based on the editing input, may maintain sampling rates for the second to nth photographer devices 300B (that is, video data that is not included in the relay broadcasting content) at low levels. Thus, quality of the second to Nth sampling video data 410B to 410N received from the second to $N^{th}$ photographer devices 300B to 300N may be maintained at even lower levels (e.g., 5%) than the original data.

With continuing reference to FIG. 4, editing data 420 specified by the editing input may form the relay broadcasting content along with first sampling video data 410A and second sampling audio data 410B, and the relay broadcasting content produced in this way may be transmitted to the viewer device 400' or stored in a certain storage (not shown).

According to an embodiment of the present invention, the plurality of photographer devices need not necessarily be present as separate devices, and a plurality of imagers or recorders physically included in one device may also be assumed to be the photographer device of the present invention.

Figure 5:
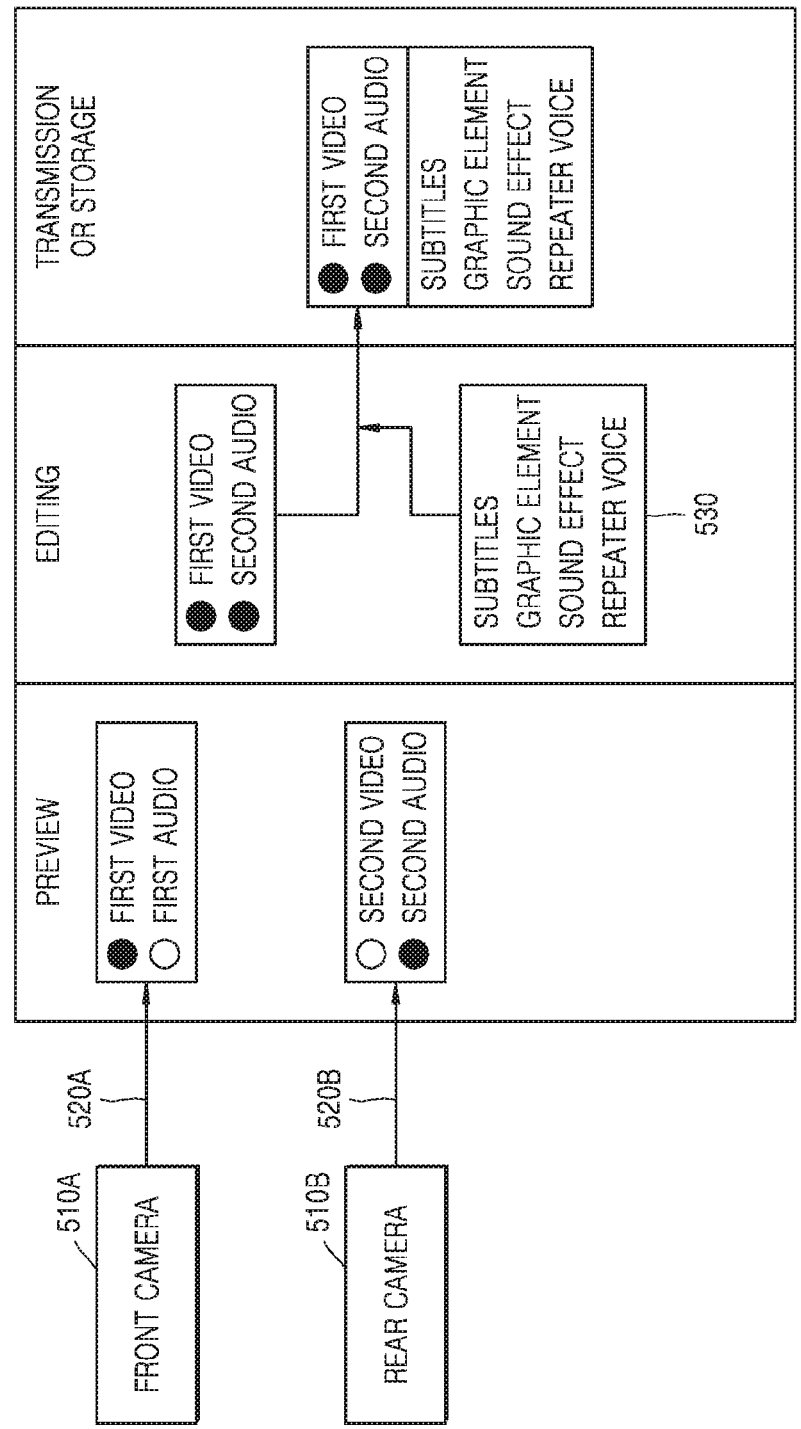
FIG. 5 is a diagram illustrating a configuration in which relay broadcasting content is produced using video data or audio data generated by a plurality of imagers or recorders included in one device according to an embodiment of the present invention.

FIG. 5 is a diagram illustrating a configuration in which relay broadcasting content is produced using video data or audio data generated by a plurality of imagers or recorders included in one device according to an embodiment of the present invention.

Referring to FIG. 5, first video data and second video data may be generated by a front camera 510A and a rear camera 510B included in one photographer device 300' (or one relay device 200'), respectively. As described in the embodiment of FIG. 4, first sampling video data 520A to be edited may have a higher sampling rate than second sampling video data 520B not to be edited.

Also, according to an embodiment of the present invention, editing data for editing relay broadcasting content may be specified by a touch-based editing input that is entered through the relay device 200' in real time. For example, according to a touch input that is entered in real time to a certain area of a screen on which sampling video data that is being edited is played, various graphic elements such as images, subtitles, visual effects, etc. may be added to the certain area of the sampling video data. As another example, when a horizontal or vertical sliding touch manipulation is entered while a video from a rear camera is being previewed on a screen of the relay device 200', the display state may be switched such that a video from a front camera is previewed on the screen of the relay device 200'.

Figure 6A:
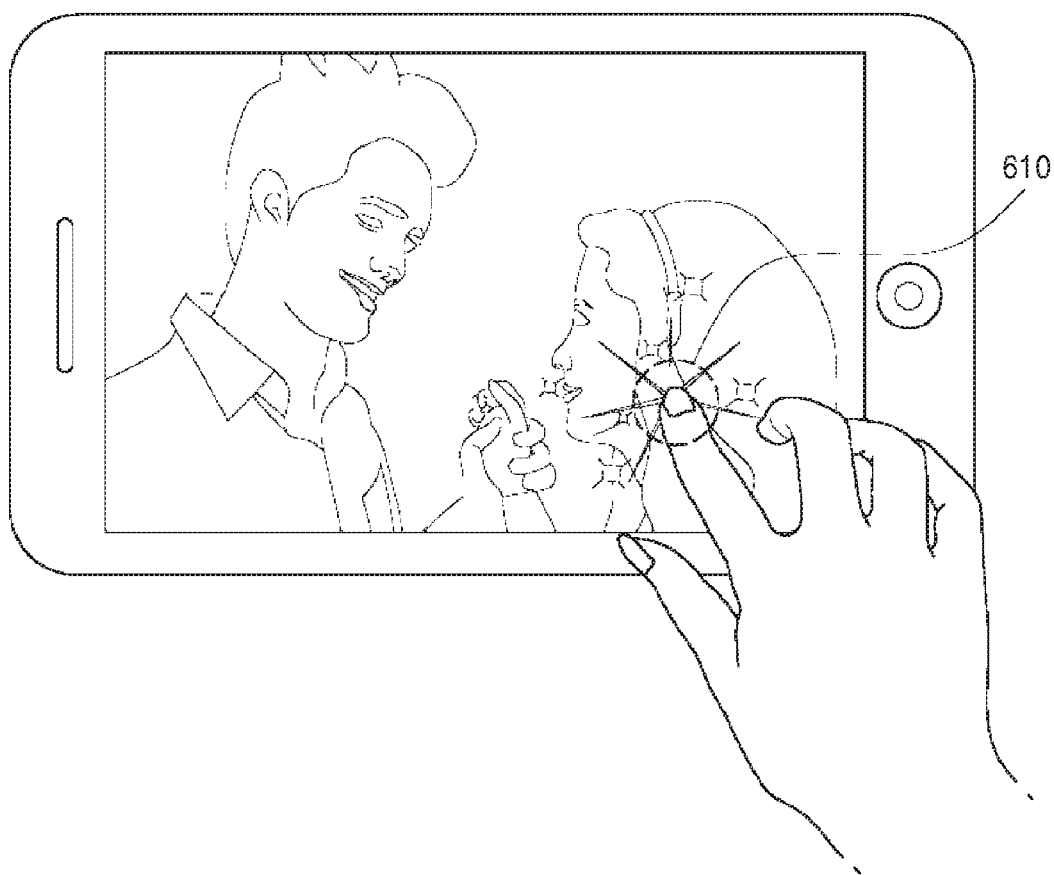
FIGS. 6A and 6B are diagrams illustrating a configuration in which editing is performed by a touch-based editing input according to an embodiment of the present invention.
Figure 6B:
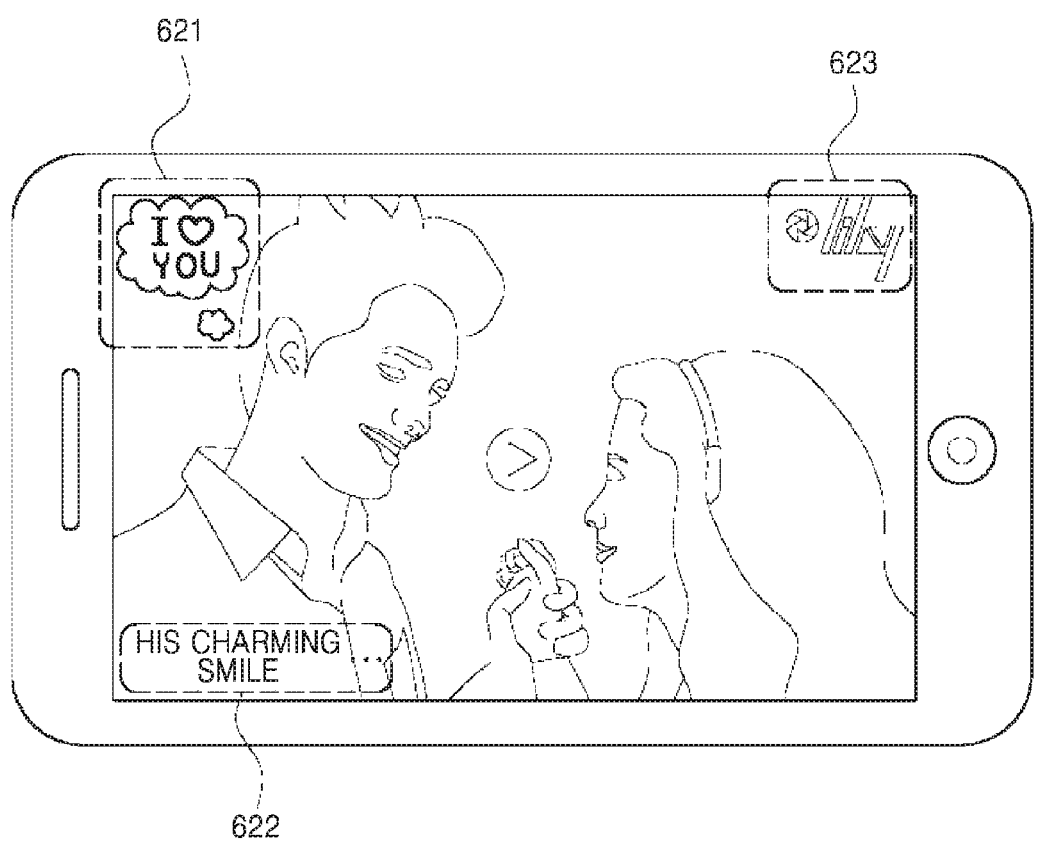

FIGS. 6A and 6B are diagrams illustrating a configuration in which editing is performed by a touch-based editing input according to an embodiment of the present invention.

Referring to FIGS. 6A and 6B, by an editor entering a touch manipulation 610 to a screen in which sampling video data is being played, various graphic elements 621, 622, and 623 may be added to a position to which the touch manipulation has been entered.

According to an embodiment of the present invention, a communication unit 240' functions to enable the relay device 200' to communicate with an external system such as the photographer device 300' or the viewer device 400'.

Last, according to an embodiment of the present invention, the controller 250' functions to control a flow of data among the data receiver 210', the relay broadcasting content editor 220', the relay broadcasting content transmitter 230', and the communication unit 240'. That is, the controller 250' controls the data receiver 210', the relay broadcasting content editor 220', the relay broadcasting content transmitter 230', and the communication unit 240' to perform their unique functions by controlling a flow of data among elements of the relay device 200' or a flow of data to/from the outside.

In the following description of FIG. 7 to FIG. 14, a method or apparatus for supporting relay broadcasting including an image processing method or apparatus using a mobile device according to another embodiment of the present invention will be described. The following description and FIGS. 7 to 18 are applicable to the embodiments described in FIGS. 1 to 6, and particularly to a method of reproducing and displaying an image on a screen when editing a relay broadcast or transmitting a relay broadcast can be. However, the embodiments described in FIGS. 1 to 6 and the following embodiments of FIGS. 7 to 14 do not necessarily have the same terms. For example, the second video data (the data in which the first video data is converted) described below may be different from the second video data (the data generated in the second photographer device) described above.

In the present disclosure, the term "main device" (see reference numeral "100" of FIG. 1) should be understood to include a terminal having a function of capturing moving pictures, including video data and audio data. Examples of the main device may include a mobile device manipulated by a user, such as a notebook computer, a handheld device, a smart phone, a tablet personal computer (PC), etc., a desktop computer, and any appropriate device using such a device or connected directly or indirectly to such a device. However, the main device is not limited thereto and any terminal having a web browsing function and a video capturing function may be employed as the main device without limitation. In the following embodiments, the main device may be, for example, a mobile terminal capable of running a real-time image relaying application. The main device may serve as a repeater which transmits an image captured by the main device itself and/or an image received from a subdevice to a media platform.

In the present disclosure, the term "subdevice" (see reference numeral "200" of FIG. 1) should be understood to include at least one terminal connected to the main device and having a function of capturing moving pictures, including video data and audio data. The subdevice may transmit video data converted to a predetermined format to the main device. Examples of the subdevice may include a mobile device manipulated by a user, such as a notebook computer, a handheld device, a smart phone, a tablet PC, etc., a desktop computer, and any appropriate device using such a device or connected directly or indirectly to such a device. However, the subdevice is not limited thereto and any terminal having a web browsing function and a video capturing function as described above may be employed as the subdevice without limitation. In the following embodiments, the subdevice may be, for example, a mobile terminal capable of running a real-time image relaying application.

Hereinafter, embodiments will be described in detail with reference to the accompanying drawings, in which the same elements or corresponding elements are assigned the same reference numerals and are not redundantly described here.

Figure 7:
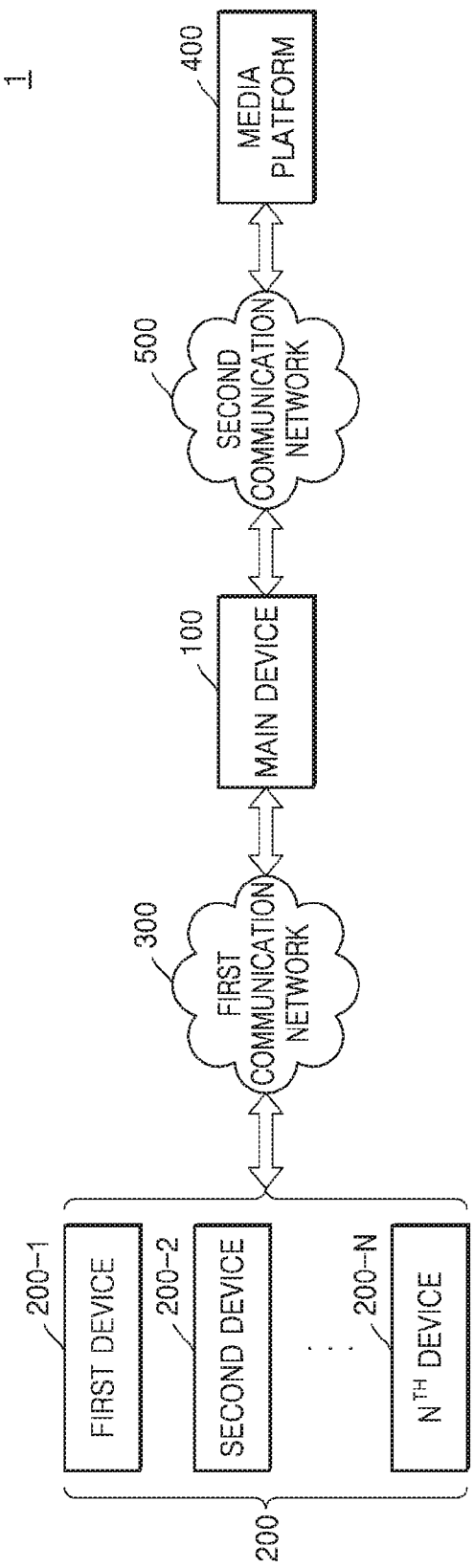
FIG. 7 is a diagram schematically illustrating an image processing system according to an embodiment.

FIG. 7 is a diagram schematically illustrating an image processing system 1 according to an embodiment. Referring to FIG. 7, the image processing system 1 may include a main device 100, a subdevice 200, a first communication network 300, a media platform 400, and a second communication network 500. The subdevice 200 may include a first device 200-1 to an $N^{th}$ device 200-N.

The main device 100 may detect the first to $N^{th}$ devices 200-1 to 200-N which are within a communication radius of the first communication network 300 as the subdevice 200, and transmit a signal requesting connection to the main device 100 to the detected first to $N^{th}$ devices 200-1 to 200-N. When receiving a signal permitting connection to the main device 100 from one of the first to $N^{th}$ devices 200-1 to 200-N, the main device 100 may start connection to the device transmitting the signal permitting connection to the main device 100. Here, the main device 100 may set the media platform 400 as an external device to which a moving picture (including second video data and first audio data) is transmitted in real time during the detecting of the first to $N^{th}$ devices 200-1 to 200-N or while starting the connection. When the main device 100 completes the starting of the connection, a shooting start signal is generated and transmitted to the first to $N^{th}$ devices 200-1 to 200-N. Thus, a same shooting start time may be recorded on the main device 100 and the first to $N^{th}$ devices 200-1 to 200-N.

The main device 100 may capture moving pictures of a subject, including first audio data and first video data, at a predetermined location in real time. The first video data may be captured by a charge-coupled device (CCD) (not shown) and the first audio data may be recorded by an internal microphone (not shown).

The main device 100 may convert the first video data captured in real time into the second video data. Here, the first video data may be raw data which is non-processed data containing data processed to a minimum level by a CCD (not shown) included in the main device 100. In general, the raw data is not compressed or is losslessly compressed, and white balance, brightness, tone, chroma, etc. of the raw data are not determined. The raw data includes only information sensed by an image sensor. The second video data may include video data obtained by converting the first video data to a predetermined format. The second video data may include a bitmap format. Here, the second video data is not limited to the bitmap format, and may include an image format such as a joint photographic expert group (JPEG) format, a graphics interchange format (GIF), a portable network graphics (PNG) format, or the like.

The main device 100 may display the second video data converted from the first video data by the main device 100 itself on a first display region, and display one or more pieces of second video data received from the subdevice 200 on a second display region. The second display region is different from the first display region and is divided into one or more subregions. In general, the main device 100 encodes and decodes the first video data and the first audio data transmitted from the subdevice 200 and displays a result of encoding and decoding the first video data and the first audio data on a display region. Thus, it takes time to encode and decode the first video data and the first audio data. This time may be a major cause of delays in real-time broadcasting. Furthermore, moving pictures cannot be reproduced in real time at the media platform 400 due to this time. However, in the present embodiment, the second video data is received from the subdevice 200 and displayed on the second display region without being encoded and decoded. Thus, moving pictures may be processed in real time and be thus reproduced in real time at the media platform 400.

The main device 100 may switch the second video data, which is received from the subdevice 200 and displayed on a subregion selected according to a request to select one subregion, to be displayed on the first display region. Thus, the second video data captured by the main device 100 or the second video data received from the subdevice 200 may be displayed on the first display region. Furthermore, both the second video data displayed on the first display region and the second video data displayed on the second display region may include video data captured in real time and converted.

In an alternative embodiment, in order to play and display on one screen a plurality of pieces of second video data including second video data captured by the main device 100 and one or more pieces of second video data received from the subdevice 200, the main device 100 may generate a first layer (surface) for displaying one of the plurality of pieces of second video data to the screen and at least one second layer for displaying the plurality of pieces of second video data to a part of the screen, play and display the first layer and the at least one second layer to be overlaid with each other on the screen through hierarchical combining, and perform blocking on a second layer corresponding to the first layer. Here, the performing of the blocking on the second layer may be understood as processing the second layer to be transparent so that a hidden portion of the first layer corresponding to the second layer may be visualized.

Conventionally, when one or more pieces of second video data are received from the subdevice 200, the main device 100 performs hardware coding on the one or more pieces of second video data and displays the coded second video data on the main device 100. Thus, a video capturing function of the main device 100, i.e., an operation of a CCD thereof, is discontinued in the process. In contrast, in the present embodiment, the main device 100 does not additionally perform hardware coding, but performs software coding, and reproduces and displays one or more pieces of second video data received from the subdevice 200 by generating a plurality of independent layers. Thus, the video capturing function of the main device 100, i.e., the operation of the CCD, may be continuously performed.

As described above, the main device 100 generates a plurality of layers and the CCD of the main device 100 is turned on to continuously capture a moving picture while playing and displaying one or more pieces of second video data from the subdevice 200. Thus, even if second video data cannot be received from the subdevice 200 due to an error occurring in the first communication network 300, second video data and first audio data captured by the main device 100 may be relayed in real time to the media platform 400 and thus may be reproduced in real time at the media platform 400.

When a screen switch event signal regarding a second layer among the at least one second layer played and displayed on the screen is received, the main device 100 may switch the second layer to the first layer, switch the first layer which has yet to be switched to the second layer, synthesize the first layer and the at least one second layer into one screen after performing switching through hierarchical combining and play and display the synthesized layer, and perform blocking on the second layer corresponding to the first layer after the switching. Here, the performing of the blocking on the second layer may be understood as processing the second layer to be transparent so that a hidden portion of the first layer corresponding to the second layer may be visualized.

The main device 100 may insert a watermark received from a user into the second video data displayed on the first display region. Alternatively, the main device 100 may insert the watermark received from the user into the second video data played and displayed on the first layer. Here, the watermark may include various graphic elements such as an image, subtitles, a visual effect, etc. The main device 100 may provide an additional user interface to insert the watermark into the first display region of a first layer.

The main device 100 may encode the second video data displayed on the first display region and the first audio data. Alternatively, the main device 100 may encode the second video data and the first audio data played and displayed on the first layer. The main device 100 may transmit a moving picture, including the encoded second video data and first audio data, to the media platform 400 which is an external device. Here, the main device 100 may transmit the encoded second video data and first audio data to the media platform 400 according to a real time messaging protocol (RTMP) which is a communication protocol.

The subdevice 200 may be connected to the main device 100 via the first communication network 300, and may capture a moving picture of a subject, which includes first audio data and first video data, in real time at least one location which is the same as or different from a location where the main device 100 photographs the subject.

The subdevice 200 may communicate with the main device 100 within a communication radius of the first communication network 300, transmit a connection permitting message to the main device 100 when receiving a connection request signal from the main device 100, and start capturing a moving picture when receiving a shooting start signal from the main device 100.

The subdevice 200 may convert first video data of a captured moving picture into second video data and transmit the second video data to the main device 100. Here, first audio data recorded by the subdevice 200 is not transmitted to the main device 100, and only the second video data may be transmitted to the main device 100.

The first communication network 300 may enable exchange of data between the main device 100 and the subdevice 200. The first communication network 300 may be understood as a communication network providing a connection path to exchange data between the main device 100 and the subdevice 200 when the main device 100 and the subdevice 200 are connected to each other. Here, the first communication network 300 may include Wi-Fi direct. Wi-Fi direct may be understood as a communication network whereby device-to-device communication may be established between the main device 100 and the subdevice 200 even when not part of a home network, an office network, or a hotspot network. When Wi-Fi direct is used, communication may be established between the main device 100 and the subdevice 200 without using a router. In this case, a communication radius may be about 70 meters.

In general, a wireless local area network (LAN) mainly handles an operation of an infrastructure basic service set (BSS) in which a router serves as a hub. The router performs a function of supporting a physical layer for wireless/wired connection, a function of routing devices in a network, a function of providing a service to add a device to or remove a device from a network, etc. In this case, the devices in the network are connected to each other via the router without being directly connected to each other. However, in the present embodiment, communication may be directly established between the main device 100 and the subdevice 200 through Wi-Fi direct without using a router.

The media platform 400 may receive a moving picture (including second video data and first audio data) from the main device 100 via the second communication network 500, and reproduce the moving picture in real time. The media platform 400 may include, for example, a system providing a social network service (SNS) site where moving picture content is shared, e.g., Africa TV, YouTube, Facebook, etc.

The second communication network 500 connects the main device 100 and the media platform 400 to each other. That is, the second communication network 500 means a communication network providing a connection path in which the main device 100 is connected to the media platform 400 to transmit data to or receive data from the media platform 400. Examples of the second communication network 500 include wired networks such as LANs, Wide Area Networks (WANs), Metropolitan Area Networks (MANs), Integrated Service Digital Networks (ISDNs), etc., or wireless networks such as wireless LANs, CDMA, Bluetooth, satellite communication, etc., but the scope of the inventive concept is not limited thereto. In the present embodiment, the first communication network 300 and the second communication network 500 are differently embodied but the second communication network 500 may include the first communication network 300.

Figure 8:
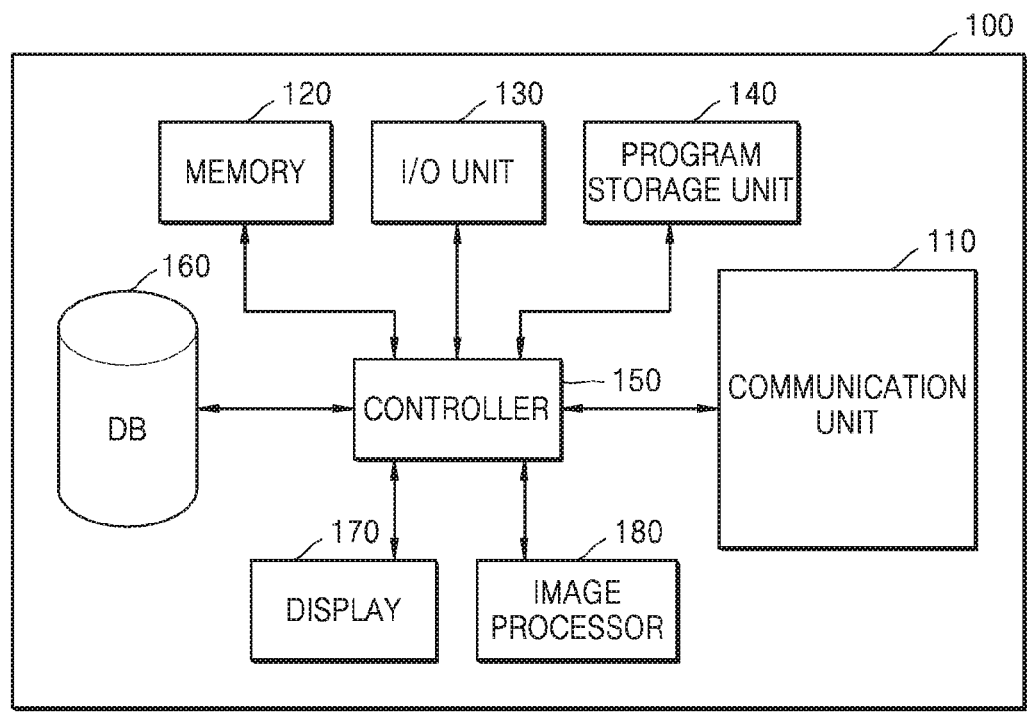
FIG. 8 is a schematic block diagram of a structure of a main device included in the image processing system of FIG. 1.

FIG. 8 is a schematic block diagram of a structure of the main device 100 included in the image processing system 1 of FIG. 7. Elements of FIG. 8 that are the same as those of FIG. 7 will not be redundantly described below. Referring to FIG. 8, the main device 100 may include a communication unit 110, a memory 120, an input/output (I/O) unit 130, a program storage unit 140, a controller 150, a database 160, a display 170, and an image processor 180.

The communication unit 110 may provide a communication interface needed to provide, in the form of packet data, a signal to be exchanged between the main device 100 and the subdevice 200 while being linked to the first communication network 300. The communication unit 110 may transmit a connection request signal to the first to $N^{th}$ devices 200-1 to 200-N included in the subdevice 200 which is within a first communication radius, receive a connection permission signal from the first to $N^{th}$ devices 200-1 to 200-N, generate a shooting start signal and transmit it to the first to $N^{th}$ devices 200-1 to 200-N, and receive second video data from the first to $N^{th}$ devices 200-1 to 200-N.

Furthermore, the communication unit 110 may provide a communication interface needed to provide, in the form of packet data, a signal to be exchanged between the main device 100 and the media platform 400 while being linked to the second communication network 500. The communication unit 110 may be connected to the media platform 400 to transmit the second video data and first audio data to the media platform 400 in real time.

The communication unit 110 may be a device including hardware and software needed to connect the communication unit 110 to another network device so as to transmit a signal, such as a control signal or a data signal, to the other network device or receive the signal from the other network device.

The memory 120 performs a function of temporarily or permanently storing data processed by the controller 150. In the present embodiment, the memory 120 may store second video data received from the subdevice 200, and a moving picture (including first video data and first audio data) captured by the main device 100. Here, the memory 120 may include a magnetic storage medium or a flash storage medium but the scope of the inventive concept is not limited thereto.

The I/O unit 130 may be embodied as a touch recognition display controller or other various I/O controllers. For example, the touch recognition display controller may provide an output interface and an input interface between a device and a user. The touch recognition display controller may transmit an electrical signal to or receive it from the controller 150. Furthermore, the touch recognition display controller may display a visual output and/or an audio output to a user. The visual output may include text, graphics, an image, video, or a combination thereof. The audio output may include audio which is in synchronization with the visual output. The I/O unit 130 may be, for example, a display member having a touch recognition function, such as an organic light-emitting display (OLED) or a liquid crystal display (LCD).

The program storage unit 140 includes control software for performing detecting of the subdevice 200 in a first wireless communication environment, transmitting a connection request signal to the subdevice 200, receiving the connection permission signal from the subdevice 200, transmitting a shooting start signal to the subdevice 200, receiving a second video signal from the subdevice 200, converting the first video data captured by the main device 100 into second video data, displaying on a display region the second video data and second video data received from the subdevice 200, generating a plurality of layers, playing and displaying the second video data and the second video data received from the subdevice 200 by transmitting the second video data to the plurality of layers, inserting a watermark into the second video data, encoding the second video data and the first audio data, transmitting the second video data and the first audio data to the media platform 400, etc.

The controller 150 is a type of central processing unit (CPU), and may control a whole process of transmitting, to the media platform 400, either the second video data received from the subdevice 200 or the second video data converted from the first video data included in the moving picture captured by the main device 100, and the first audio data included in the moving picture captured by the main device 100. As described above, the controller 150 may control a whole processing process related to exchange of data among the main device 100, the subdevice 200, and the media platform 400.

The database 160 may include information regarding a user and a device using the main device 100 and the subdevice 200 in relation to a real-time image relaying application installed in the main device 100 and the subdevice 200.

The display 170 may reproduce the moving picture which is being captured by the main device 100, i.e., the, first video data and the first audio data. The display 170 may be, for example, a display member having a touch recognition function, such as an OLED or an LCD. The display 170 may include a first display region and a second display region. The second video data received from the subdevice 200 may be displayed on the second display region. The second display region may be divided into one or more subregions. The number of the one or more subregions may be the same as the number of the first to $N^{th}$ devices 200-1 to 200-N which transmit the connection permission signal. Furthermore, the display 170 may include a first layer and at least one second layer for playing and displaying a plurality of pieces of second video data on one screen. The second video data captured by the main device 100 and the second video data received from the subdevice 200 may be played and displayed on the at least one second layer. The number of the at least one second layer may be equal to the sum of the number of the first to $N^{th}$ devices 200-1 to 200-N transmitting the connection permission signal and the number of the main device 100. The sum of the number of the first layer and the number of the at least one second layer may be greater by 1 than the sum of the number of the first to $N^{th}$ devices 200-1 to 200-N transmitting the connection permission signal and the number of the main device 100. The display 170 may display a user interface on the second video data displayed on the first display region or the first layer, through which a watermark may be inserted, and may display on the first display region a status of inserting the watermark.

The image processor 180 may start connection to the subdevice 200 by detecting the first to $N^{th}$ devices 200-1 to 200-N included in the subdevice 200 which is in a communication radius of the first communication network 300. The image processor 180 may capture a moving picture (including first audio data and first video data) of a subject at a location in real time, and convert the first video data into second video data. The image processor 180 may display the second video data converted from the first video data on the first display region, and display one or more pieces of second video data received from the subdevice 200 on the second display region which is different from the first display region and which is divided into one or more subregions. The image processor 180 may switch the second video data, which is received from the subdevice 200 and displayed on a subregion selected according to a request to select one subregion, to be displayed on the first display region.

In an alternative embodiment, the image processor 180 may generate a first layer and at least one second layer. In order to play and display on one screen a plurality of pieces of second video data including second video data captured by the main device 100 and one or more pieces of second video data received from the subdevice 200, the image processor 180 may transmit one of the plurality of pieces of second video data to the first layer and the plurality of pieces of second video data to each of the at least one second layer. The image processor 180 may play and display the first layer and the at least one second layer to be overlaid with each other on one screen through hierarchical combining, and perform blocking on a second layer corresponding to the first layer. When a screen switch event signal regarding the first layer and one of the at least one second layer played and displayed on the display 170 of the main device 100 is received, the image processor 180 may switch the second layer to the first layer, switch the first layer which has yet to be switched to the second layer, synthesize, play and display the first layer and the at least one second layer as one screen after performing switching through hierarchical combining, and perform blocking on the second layer corresponding to the first layer after the performing of the switching.

The image processor 180 may insert a watermark received from a user into the second video data displayed on the first display region or the first layer. The image processor 180 may encode the second video data displayed on the first display region or the first layer and the first audio data, and transmit a moving picture including the encoded second video data and first audio data to the media platform 400 according to the RTMP.

Figure 9:
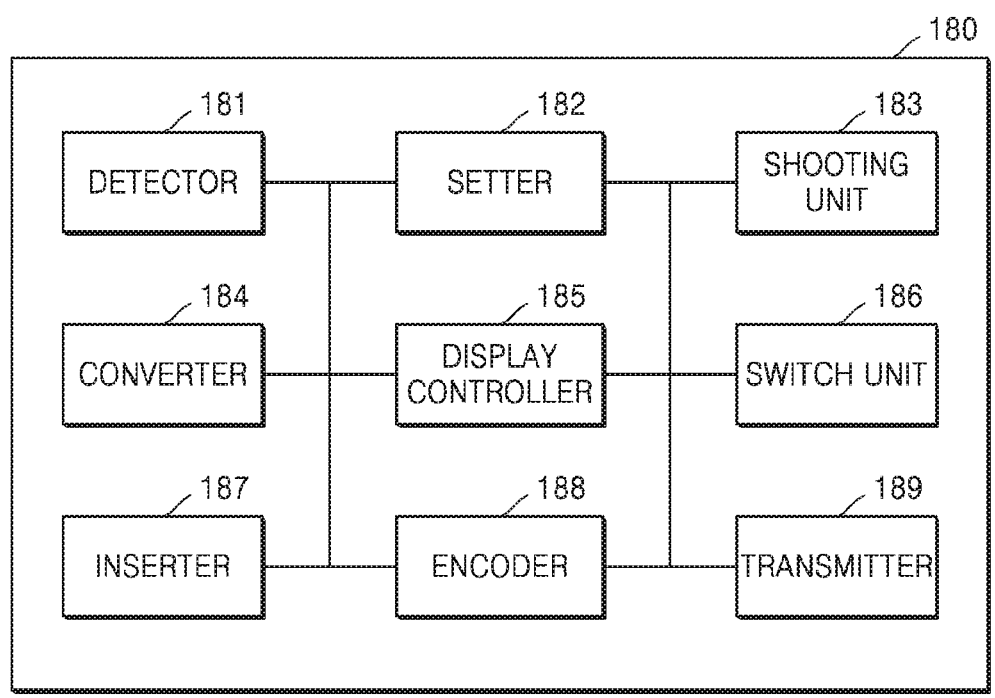
FIG. 9 is a schematic block diagram of a structure of an image processor of the main device of FIG. 2.

FIG. 9 is a schematic block diagram of a structure of the image processor 180 of the main device 100 of FIG. 8. Elements of FIG. 9 that are the same as those of FIGS. 7 and 8 will not be redundantly described here. Referring to FIG. 9, the image processor 180 may include a detector 181, a setter 182, a shooting unit 183, a converter 184, a display controller 185, a switch unit 186, an inserter 187, an encoder 188, and a transmitter 189.

The detector 181 may detect the first to $N^{th}$ devices 200-1 to 200-N which are within the communication radius of the first communication network 300 as the subdevice 200 and output a result of detecting the first to $N^{th}$ devices 200-1 to 200-N as the subdevice 200 to the display 170 when a signal requesting to detect the subdevice 200 is received from a user.

The setter 182 may check the result of detecting the first to $N^{th}$ devices 200-1 to 200-N included in the subdevice 200, select at least one among the first to $N^{th}$ devices 200-1 to 200-N, and transmit a connection request signal requesting to connect to the main device 100 to the selected at least one device. When receiving a connection permission signal from the selected at least one device to which the connection request signal is transmitted, the setter 182 may display the selected at least one device transmitting the connection permission signal on the display 170, and start connection to the main device 100 according to a selection signal with respect to the selected at least one device.

The setter 182 may set the media platform 400 as an external device to which a moving picture (including second video data and first audio data) is to be transmitted during the detecting of the first to $N^{th}$ devices 200-1 to 200-N included in the subdevice 200 or the starting of the connection to the main device 100. When the setter 182 completes setting of the starting of the connection to the main device 100, a shooting start signal may be generated and transmitted to the first to $N^{th}$ devices 200-1 to 200-N and thus the same shooting start time may be recorded on the main device 100 and the first to $N^{th}$ devices 200-1 to 200-N.

Although not shown, the shooting unit 183 may include a camera having a shutter, a series of lenses, an iris, and a CCD, an analog-to-digital converter (ADC), a microphone, etc. The shooting unit 183 may capture, through the shutter, a moving picture including first audio data and first video data of a subject at a location in real time. The shooting unit 183 may capture the first video data by using the CCD and record the first audio data by using the microphone.

The converter 184 may convert the first video data captured in real time into second video data. Here, the first video data may be raw data including data processed to a minimum level by the CCD included in the shooting unit 183. The second video data may include video data obtained by converting the first video data to a certain format, e.g., data which is in a bitmap format. Furthermore, the converter 184 may generate second video data by converting a frame rate and/or resolution of the first video data according to a control signal.

The display controller 185 may display on the display 170 the second video data converted from the first video data by the converter 184 and one or more pieces of second video data received in real time from the first to $N^{th}$ devices 200-1 to 200-N included in the subdevice 200.

Figure 10:
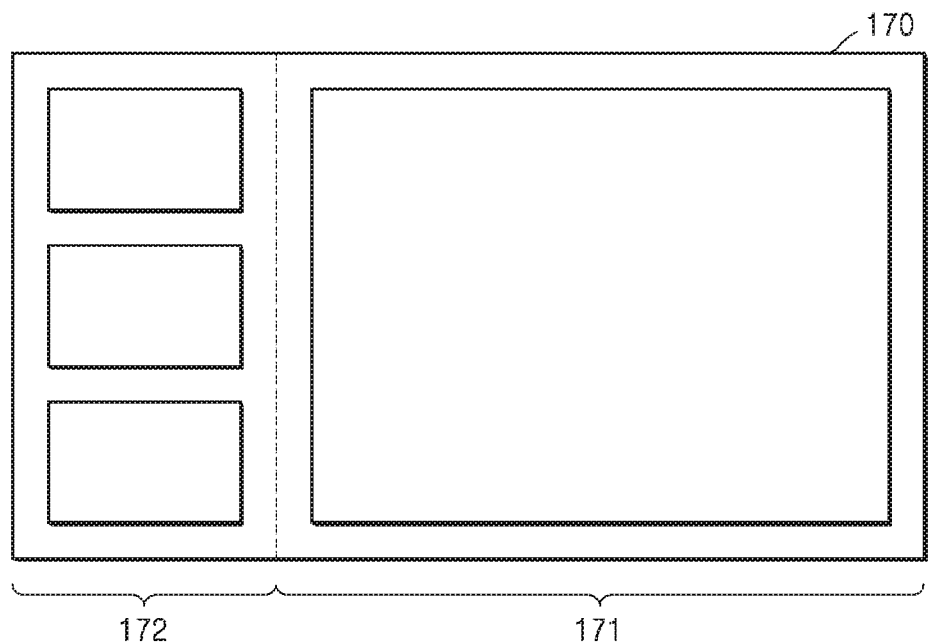
FIG. 10 is a diagram schematically illustrating a structure of a display included in the main device of FIG. 1.

FIG. 10 is a diagram schematically illustrating a structure of the display 170 included in the main device 100 of FIG. 7, according to an embodiment. FIG. 10 illustrates a structure of the display 170. Referring to FIG. 10, the display 170 may include a first display region 171 and a second display region 172. Here, the second display region 172 is divided into a plurality of subregions. The number of the plurality of subregions may be equal to that of the first to $N^{th}$ devices 200-1 to 200-N starting connection to the main device 100. The second display region 172 may be divided into the plurality of subregions at a point of time when a connection between the main device 100 and the first to $N^{th}$ devices 200-1 to 200-N is started by the display controller 185.

The display controller 185 may display the second video data converted from the first video data by the converter 184 on the first display region 171, and second video data received from the first to $N^{th}$ devices 200-1 to 200-N on the plurality of subsections of the second display region 172. Here, the second video signal displayed on the first display region 171 may be transmitted in real time to the media platform 400. A frame rate of the second video signal displayed on the first display region 171 may be different from that of the second video data displayed on each of the plurality of subregions of the second display region 172. For example, second video data of 30 frames per second may be displayed on the first display region 171, and second video data of 15 frames per second may be displayed on each of the plurality of subregions of the second display region 172. As illustrated in FIG. 10, since each of the plurality of subregions of the second display region 172 is smaller in size than the first display region 171, second video data of a lower frame rate may be displayed on each of the plurality of subregions of the second display region 172.

Since second video data received from the first to $N^{th}$ devices 200-1 to 200-N in real time is displayed on each of the plurality of subregions of the second display region 172, the display controller 185 may control the main device 100 to display second video data of 30 frames per second on the first display region 171 and control the first to $N^{th}$ devices 200-1 to 200-N to display second video data of 15 frames per second, simultaneously with transmission of a shooting start signal to the first to $N^{th}$ devices 200-1 to 200-N. Thus, the second video data of 15 frames per second received from the first to $N^{th}$ devices 200-1 to 200-N may be displayed on each of the plurality of subregions of the second display region 172.

Although the second video data displayed on the first display region 171 and the second video data displayed on each of the plurality of subregions of the second display region 172 are different from each other in terms of frame rate in the present embodiment, they may be different from each other in terms of resolution rather than frame rate. For example, the display controller 185 may display second video data having resolution of 1280×720 on the first display region 171, and second video data having resolution of 640×480 on each of the plurality of subregions of the second display region 172.

The switch unit 186 may switch the second video data, which is displayed on a subregion selected according to a request to select one subregion, received from a user, to be displayed on the first display region 171, in a state in which the second video data converted from the first video data by the converter 184 is displayed on the first display region 171 and the second video data received from the first to $N^{th}$ devices 200-1 to 200-N is displayed on each of the plurality of subregions of the second display region 172.

Here, when the second video data displayed on the subregion is switched to be displayed on the first display region 171, the switch unit 186 may transmit a control signal instructing to transmit second video data having a different frame rate to one of the first to $N^{th}$ devices 200-1 to 200-N which transmit the second video data to the plurality of subregions. That is, the switch unit 186 may transmit a control signal instructing to transmit second video data having a frame rate of 30 frames per second to one of the first to $N^{th}$ devices 200-1 to 200-N that transmitted second video data having a frame rate of 15 frames per second at a time of point when a subregion is selected.

Furthermore, the switch unit 186 switches second video data previously displayed on the first display region 171 to be displayed on one of the plurality of subregions of the second display region 172. In this case, the switch unit 186 may output a control signal instructing to output the second video data having a frame rate of 30 frames per second to be transmitted at a frame rate of 15 frames per second.

The inserter 187 may provide a user interface for inserting a watermark into second video data in a state in which the second video data is displayed on the first display region 171, and insert the watermark into the second video data displayed on the first display region 171 according to a user's selection. Here, the watermark may include various graphic elements such as an image, subtitles, a visual effect, etc.

The encoder 188 may encode the second video data displayed on the first display region 171 into a H.264 format and encode first audio data by using advanced audio coding (AAC). Here, even if only second video data is received from the subdevice 200 and displayed on the first display region 171, the same shooting start signal is recorded on the main device 100 and the subdevice 200. Thus, the second video data received from the subdevice 200 and the first audio data recorded by the main device 100 may be synchronous or almost synchronous with each other.

The transmitter 189 transmits encoded second video data displayed on the first display region 171 and encoded first audio data to the media platform 400 via the second communication network 500 using the RTMP. Thus, the media platform 400 may reproduce a moving picture (including the second video data and the first audio data) transmitted in real time from the main device 100.

Figure 11:
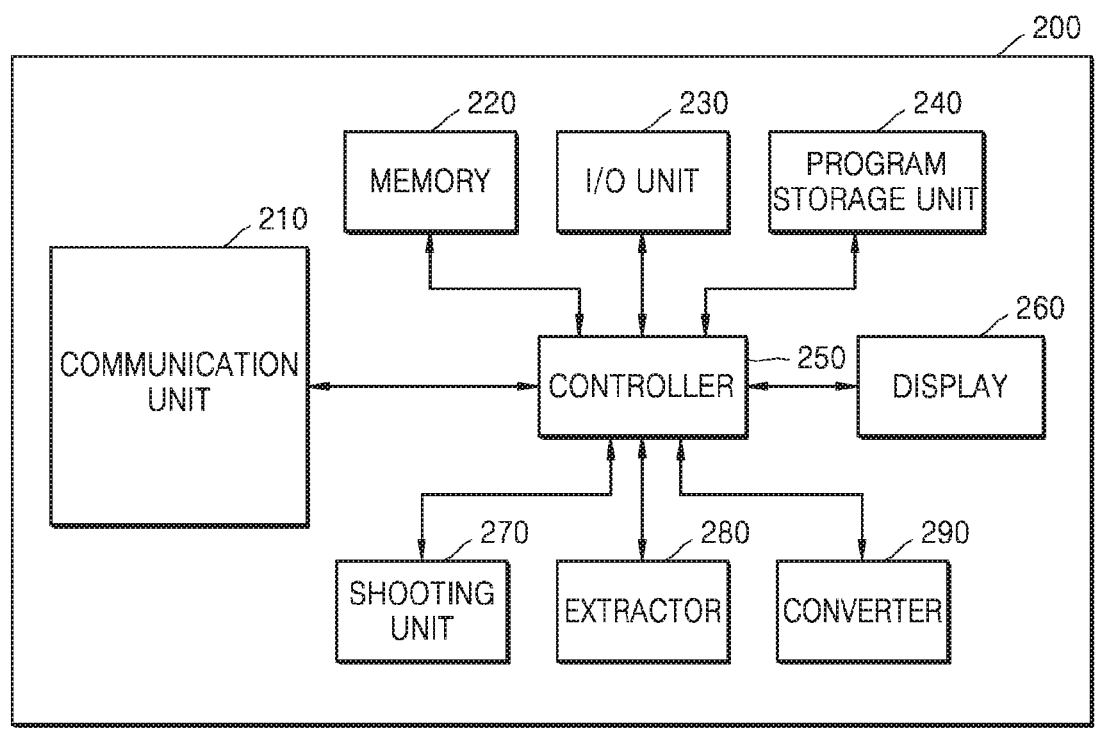
FIG. 11 is a schematic block diagram of a structure of a subdevice included in the image processing system of FIG. 7.

FIG. 11 is a schematic block diagram of a structure of the subdevice 200 included in the image processing system 1 of FIG. 7. Referring to FIG. 11, each of the first to $N^{th}$ devices 200-1 to 200-N included in the subdevice 200 may include a communication unit 210, a memory 220, an I/O unit 230, a program storage unit 240, a controller 250, a display 260, a shooting unit 270, an extractor 280, and a converter 290.

The communication unit 210 may provide a communication interface needed to provide, in the form of packet data, a signal to be exchanged between the main device 100 and the subdevice 200 while being linked to the first communication network 300. The communication unit 210 may receive a connection request signal from the main device 100, transmit a connection permission signal to the main device 100, receive a shooting start signal from the main device 100, transmit second video data to the main device 100, and transmit the second video data, the frame rate of which is converted, according to a request from the main device 100.

The communication unit 210 may be a device including hardware and software needed to connect another network device via wire or wirelessly so as to transmit a signal, such as a control signal or a data signal, to or receive the signal from the network device.

The memory 220 performs a function of temporarily or permanently storing data processed by the controller 250. In the present embodiment, the memory 220 may store a moving picture (including first video data and first audio data) captured by the subdevice 200. Here, the memory 220 may include a magnetic storage medium or a flash storage medium but the scope of the inventive concept is not limited thereto.

The I/O unit 230 may be embodied as a touch recognition display controller or any of other various I/O controllers. For example, the touch recognition display controller may provide an output interface and an input interface between a device and a user. The touch recognition display controller may transmit an electrical signal to or receive it from the controller 250. Furthermore, the touch recognition display controller displays a visual output and/or an audio output to a user. The visual output may include text, graphics, an image, video, or a combination thereof. The audio output may include audio in synchronization with the visual output. The I/O unit 130 may be, for example, a display member having a touch recognition function, such as an OLED or an LCD.

The program storage unit 240 includes control software for generating the connection permission signal and transmitting it according to the connection request signal from the main device 100, capturing a moving picture including first video data and first audio data according to a shooting start signal from the main device 100, converting the first video data included in the moving picture into second video data, converting a frame rate of the second video data according to a request from the main device 100, and so on.

The controller 250 is a type of CPU and may control a whole process of converting first video data included in a captured moving picture into second video data and transmitting the second video data to the main device 100. As described above, the controller 250 may control a whole processing process related to the exchange of data between the main device 100 and the subdevice 200.

The display 260 may reproduce a moving picture which is being captured by the subdevice 200, i.e., first video data and first audio data. Here, the display 260 may be, for example, a display member having a touch recognition function, such as an OLED or an LCD.

Although not shown, the shooting unit 270 may include a camera having a shutter, a series of lenses, an iris, and a CCD, an ADC, a microphone, etc. The shooting unit 270 may capture, from light input through a shutter, a moving picture (including first audio data and first video data) of a subject in real time at a location, which is the same as or different from a location where a subject is captured by the main device 100. The shooting unit 270 may capture the first video data by using the CCD and record the first audio data by using the microphone. The moving picture captured by the shooting unit 270 may be displayed on the display 260.

The extractor 280 may extract the first video data from the moving picture (including the first video data and first audio data) captured by the shooting unit 270, and the converter 290 may convert the first video data into second video data. Here, the converter 290 may generate second video data by converting a frame rate and/or resolution of the second video data according to a request from the main device 100. The second video data converted from the first video data by the converter 290 may be transmitted to the main device 100 via the communication unit 210 and the first communication network 300. Here, the second video data which is first transmitted to the main device 100 may have a frame rate of 15 frames per second, and may be converted into second video data having a frame rate of 30 frames per second according to the request from the main device 100 and be then transmitted to the main device 100.

Figure 12:
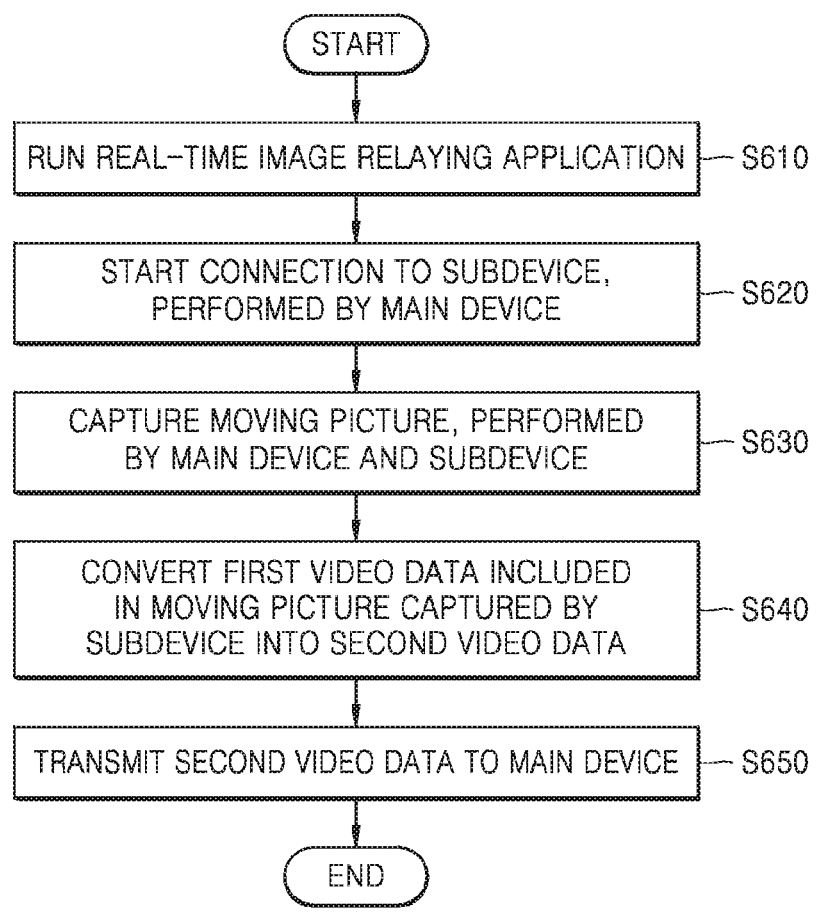
FIGS. 12 to 14 are flowcharts of image processing methods according to embodiments.

FIG. 12 is a flowchart of an image processing method according to one embodiment. In the following description, elements of the image processing method of FIG. 12 which are the same as those described above with reference to FIGS. 7 to 11 are not redundantly described here. FIG. 12 illustrates an image processing method in which data is transmitted and received between the main device 100 and the subdevice 200 via the first communication network 300, and the method is described below in terms of the subdevice 200.

Referring to FIG. 12, the main device 100 and the subdevice 200 run a real-time image relaying application according to a user's selection (operation S610).

When the running of the real-time image relaying application is completed, the main device 100 starts connection to the subdevice 200 (operation S620).

Figure 13:
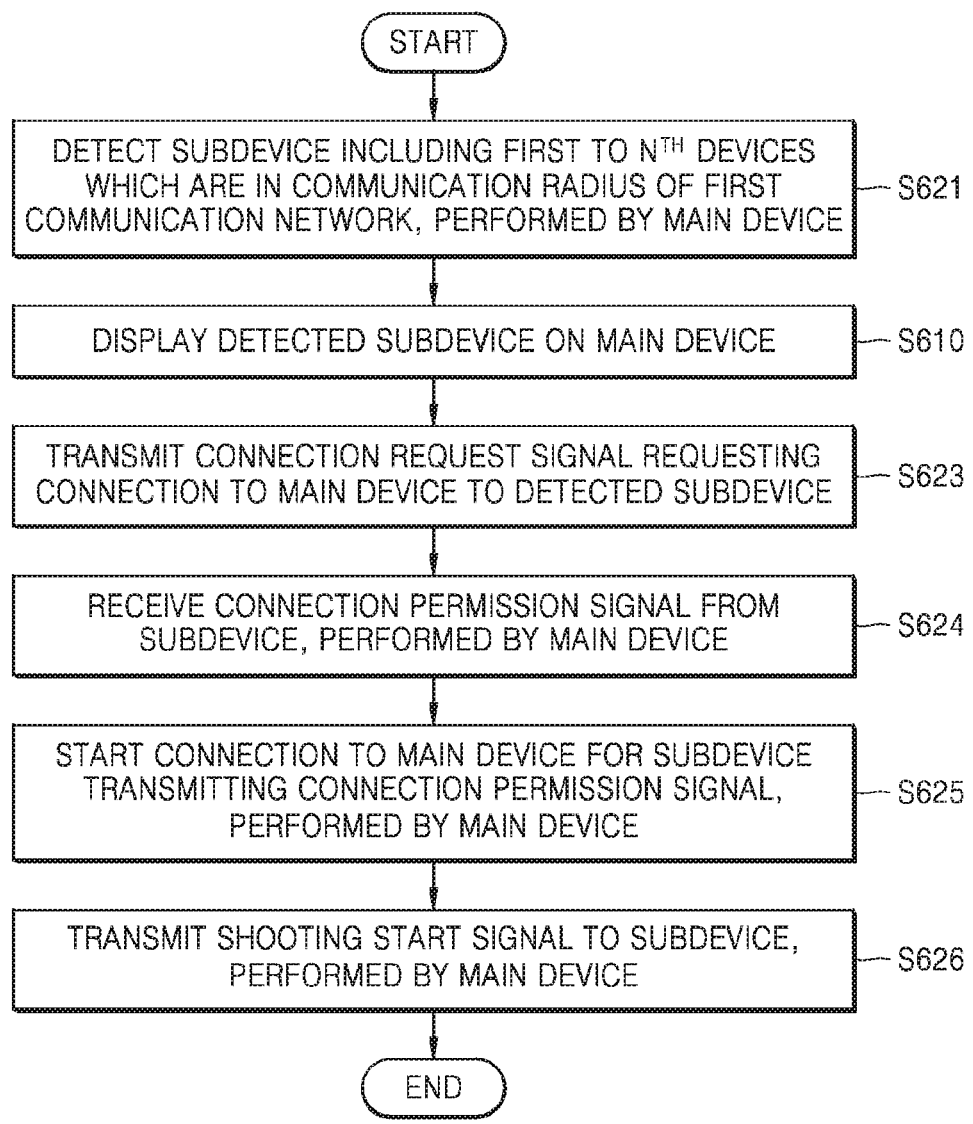

FIG. 13 is a flowchart of a method of starting connection to the subdevice 200 according to one embodiment, performed by the main device 100. Referring to FIG. 13, the main device 100 detects the first to $N^{th}$ devices 200-1 to 200-N included in the subdevice 200 which is in a communication radius of the first communication network 300 (operation S621.

The detected first to $N^{th}$ devices 200-1 to 200-N included in the subdevice 200 are displayed on the main device 100 (operation S622).

The main device 100 selects at least one device among the first to $N^{th}$ devices 200-1 to 200-N from a result of detecting the first to $N^{th}$ devices 200-1 to 200-N, and transmits a connection request signal requesting connection to the main device 100 to the at least one device (operation S623).

The main device 100 receives a connection permission signal from the at least one device to which the connection request signal is transmitted (operation S624).

The main device 100 sets connection to the main device 100 for the at least one device transmitting the connection permission signal (operation S625).

When the setting of the connection to the main device 100 is completed, the main device 100 generates a shooting start signal and transmits it to the at least one device (operation S626). Thus, same shooting start time may be recorded on the main device 100 and the at least one device.

The main device 100 may set the media platform 400 as an external device to which a moving picture (including second video data and first audio data) is to be transmitted in real time during one of operations S621 to S626 described above.

Referring back to FIG. 12, when shooting begins, each of the main device 100 and the subdevice 200 captures a moving picture in real time (operation S630). The main device 100 may capture a moving picture (including first audio data and first video data) of a subject at a location in real time. The subdevice 200 may capture a moving picture (including first audio data and first video data) of the subject in real time at a location which is the same as or different from the location where the main device 100 captures the moving picture of the subject.

The subdevice 200 converts the first video data included in the moving picture into second video data (operation S640). Here, the first video data may be raw data which is non-processed data containing data processed to a minimum level by a CCD (not shown) included in the subdevice 200. The second video data is video data obtained by converting the first video data into a predetermined format, and may contain, for example, a bitmap format. Here, the second video data is not limited to the bitmap format, and may include an image format such as a JPEG format, a GIF, a PNG format, or the like.

The subdevice 200 transmits the second video data to the main device via the first communication network 300 (operation S650). The second video data which is first transmitted from the subdevice 200 to the main device 100 may have, for example, a frame rate of 15 frames per second, and may be converted into second video data having a frame rate of 30 frames per second and be then transmitted to the main device 100 according to a request from the main device 100.

Figure 14:
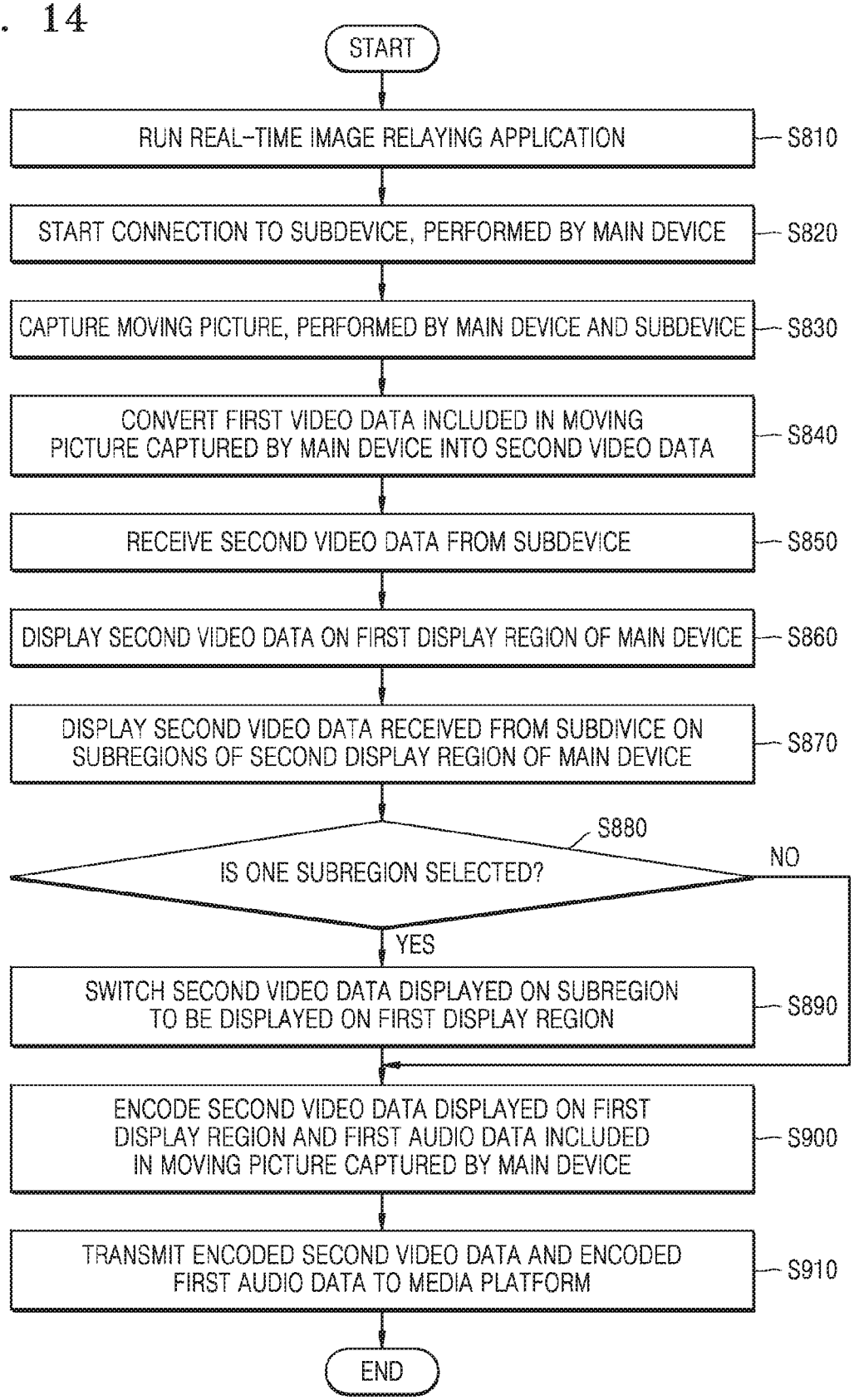

FIG. 14 is a flowchart of an image processing method according to another embodiment. In the following description, elements of the image processing method of FIG. 14 which are the same as those described above with reference to FIGS. 7 to 13 will not be redundantly described below. FIG. 14 illustrates an image processing method in which data is transmitted and received between the main device 100 and the subdevice 200 via the first communication network 300, and the method is described below in terms of the main device 100.

Referring to FIG. 14, the main device 100 and the subdevice 200 run a real-time image relaying application according to a user's selection (operation S810).

When the running of the real-time image relaying application is completed, the main device 100 starts connection to the subdevice 200 (operation S820). A method of starting connection to the subdevice 200, performed by the main device 100, is the same as that described above with reference to FIG. 13 and is thus not described again here.

When shooting is started, each of the main device 100 and the subdevice 200 captures a moving picture in real time (operation S830). The main device 100 may capture a moving picture (including first audio data and first video data) of a subject at a certain location in real time. The subdevice 200 may capture a moving picture (including first audio data and first video data) of the subject at one or more locations which are the same as or different from the location where the main device 100 captures the moving picture of the subject.

The main device 100 converts the first video data included in the moving picture into second video data (operation S840).

The main device 100 receives second video data from the first to $N^{th}$ devices 200-1 to 200-N included in the subdevice 200 which starts the capturing of the moving picture simultaneously with the capturing of the moving picture by the main device 100 (operation S850).

The main device 100 displays the second video data converted from the first video data included in the moving picture captured by the main device 100 itself on a first display region (operation S860).

The main device 100 displays the second video data received from the first to $N^{th}$ devices 200-1 to 200-N on each of a plurality of subregions of a second display region different from the first display region (operation S870).

Here, a second video signal displayed on the first display region may be transmitted to the media platform 400 in real time. Furthermore, the second video data displayed on the first display region and the second video data displayed on the plurality of subregions of the second display region may be different in a frame rate. For example, second video data having a frame rate of 30 frames per second may be displayed on the first display region, and second video data having a frame rate of 15 frames per second may be displayed on the plurality of subregions of the second display region. Since the second video data received in real time from the first to $N^{th}$ devices 200-1 to 200-N is displayed on the plurality of subregions of the second display region, the main device 100 may control a second video signal of 30 frames per second to be displayed on the first display region with respect to the main device 100 and a second video signal of 15 frames per second to be transmitted with respect to the first to $N^{th}$ devices 200-1 to 200-N, simultaneously with transmission of a shooting start signal to the first to $N^{th}$ devices 200-1 to 200-N. Thus, the second video signal of 15 frames per second received from the first to $N^{th}$ devices 200-1 to 200-N may be displayed on the plurality of subregions of the second display region.

The main device 100 determines whether a subregion among the plurality of subregions is selected by a user (operation S880).

When it is determined that a subregion is selected, the main device 100 switches second video data displayed on the selected subregion to be displayed on the first display region (operation S890). When it is determined that a subregion is not selected, the second video data converted from the first video data included in the moving picture captured by the main device 100 is displayed on the first display region.

Here, when the second video data displayed on the selected subregion is switched to be displayed on the first display region, the main device 100 may transmit a control signal instructing to transmit second video data having a different frame rate to one of the first to $N^{th}$ devices 200-1 to 200-N which transmits the second video data to the selected subregion. That is, when the subregion is selected, a control signal instructing to transmit second video data having a frame rate of 30 frames per second may be transmitted to one of the first to $N^{th}$ devices 200-1 to 200-N which previously transmitted second video data having a frame rate of 15 frames per second. Furthermore, when the main device 100 switches second video data previously displayed on the first display region to be displayed on one of the plurality of subregions of the second display region, a control signal instructing to transmit second video data having a frame rate of 30 frames per second at a frame rate of 15 frames per second may be output.

The main device 100 encodes the second video data displayed on the first display region into an H.264 format, and encodes the first audio data, which is included in the moving picture captured by the main device 100, by using AAC (operation S900). Here, even if only the second video data is received from the subdevice 200 and displayed on the first display region, the same shooting start signal is recorded on the main device 100 and the subdevice 200. Thus, the second video data received from the subdevice 200 and the first audio data recorded by the main device 100 may be synchronous or almost synchronous with each other.

The main device 100 transmits the encoded second video data displayed on the first display region and the encoded first audio data to the media platform 400 via the second communication network 500 by using the RTMP (operation S910). Thus, the moving picture (including the second video data and the first audio data) transmitted in real time from the main device 100 may be reproduced at the media platform 400.

Figure 15:
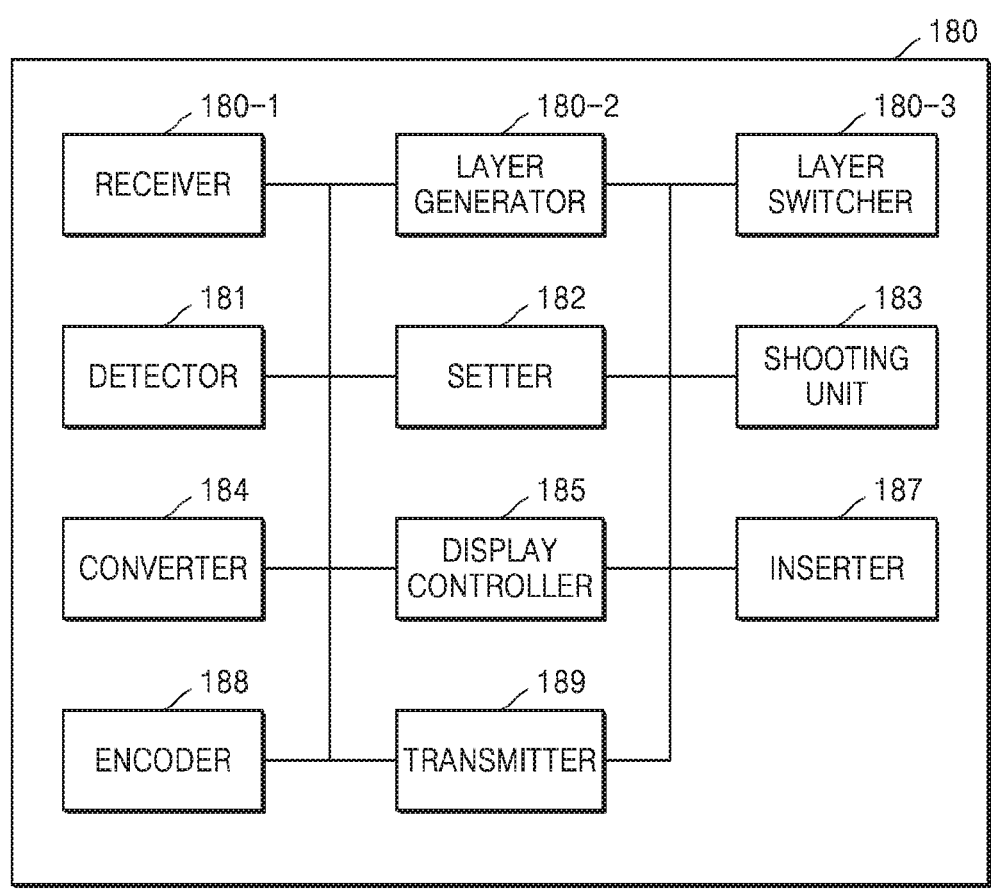
FIG. 15 is a diagram schematically illustrating a structure of an image processor of the main device of FIG. 8, according to another embodiment.

In an alternative embodiment, the main device 100 may provide a user interface for inserting a watermark in a state in which second video data is displayed on the first display region, and insert the watermark into the second video data displayed on the first display region according to a user's selection FIG. 15 is a diagram schematically illustrating a structure of the image processor 180 of the main device 100 of FIG. 8, according to another embodiment. Elements of FIG. 15 that are the same as those of FIGS. 7 to 14 will not be redundantly described here. Referring to FIG. 15, the image processor 180 may include a receiver 180-1, a layer generator 180-2, a layer switcher 180-3, a detector 181, a setter 182, a shooting unit 183, a converter 184, a display controller 185, an inserter 187, an encoder 188, and a transmitter 189.

The detector 181 may detect the first to $N^{th}$ devices 200-1 to 200-N as the subdevice 200, which are within the communication radius of the first communication network 300, and output a result of detecting the first to $N^{th}$ devices 200-1 to 200-N as the subdevice 200 to the display 170 when a signal requesting to search for the subdevice 200 is received from a user.

The setter 182 may check the result of detecting the first to $N^{th}$ devices 200-1 to 200-N as the subdevice 200, select at least one from among the first to $N^{th}$ devices 200-1 to 200-N from the detection result, and transmit a connection request signal requesting to connect to the main device 100 to the selected at least one device. When receiving a connection permission signal from the selected at least one device to which the connection request signal is transmitted, the setter 182 may display the selected at least one device transmitting the connection permission signal on the display 170, and may start connection to the main device 100 according to a selection signal with respect to the selected at least one device.

The setter 182 may set the media platform 400 as an external device to which a moving picture (including second video data and first audio data) is to be transmitted in real time during the detecting of the first to $N^{th}$ devices 200-1 to 200-N or the starting of the connection to the main device 100. When the setter 182 completes setting of the starting of the connection to the main device 100, a shooting start signal may be generated and transmitted to the first to $N^{th}$ devices 200-1 to 200-N and thus the same shooting start time may be recorded on the main device 100 and the first to $N^{th}$ devices 200-1 to 200-N.

Although not shown, the shooting unit 183 may include a camera having a shutter, a series of lenses, an iris, and a CCD, an ADC, a microphone, etc. The shooting unit 183 may capture, through the shutter, a moving picture including first audio data and first video data of a subject at a certain location in real time. The shooting unit 183 may capture the first video data by using the CCD and record the first audio data by using the microphone.

The converter 184 may convert the first video data captured in real time into second video data. Here, the first video data may be raw data including data processed to a minimum level by the CCD included in the shooting unit 183. The second video data may include video data obtained by converting the first video data to a certain format, e.g., data in a bitmap format. Furthermore, the converter 184 may generate second video data by converting a frame rate and/or resolution of the first video data according to a control signal.

The receiver 180-1 may receive second video data converted from first video data of a moving picture including the first video data and first audio data of a subject except the first audio data, the moving picture being captured at the same shooting start time as the shooting unit 183, and at one or more positions which are different from a shooting position of the shooting unit 183 by the subdevice 200 transmitting the connection permission signal, i.e., at least one among the first to $N^{th}$ devices 200-1 to 200-N.

The layer generator 180-2 may generate a first layer and at least one second layer on a screen of the display 170 to play and display on one screen a plurality of pieces of second video data including the second video data captured by the shooting unit 183 and converted by the converter 184 and at least one piece of second video data received by the receiver 180-1. Here, the first layer may include, for example, a whole screen on a region of the display 170, and the at least one second layer may include a screen which is smaller than the whole screen and located on a certain location on the whole screen, although the second layer is played and displayed together with the whole screen. For example, the first layer may correspond to the first display region described above and the second layer may correspond to the second display region described above. In the present embodiment, the second display region corresponding to the second layer is not a region separated from the first display region, but may be included in the first display region.

Figure 16:
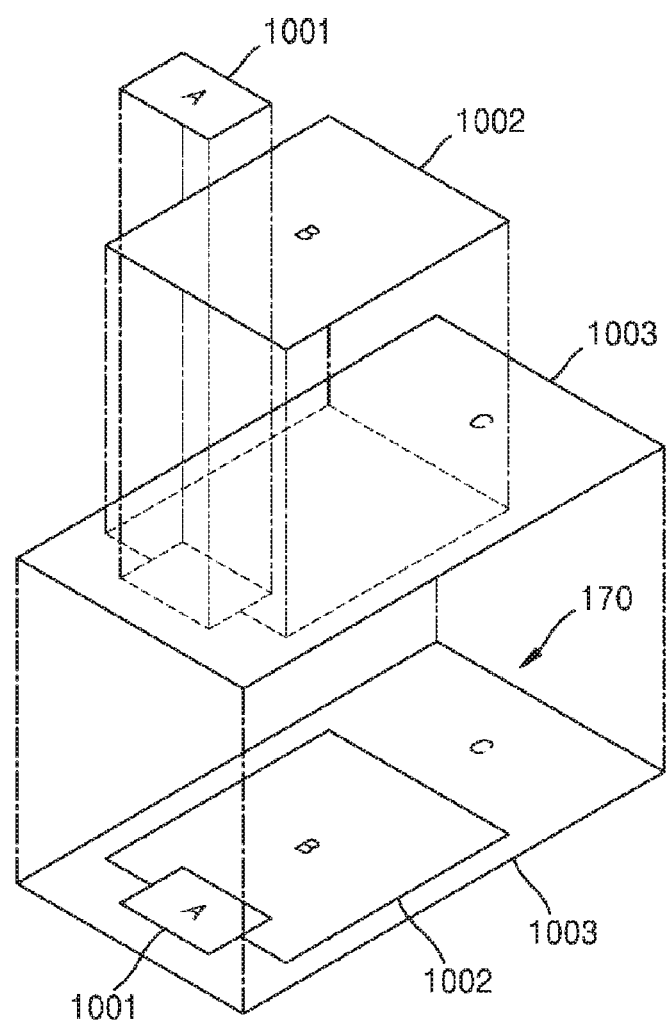
FIGS. 16 to 17B are diagrams schematically illustrating examples of a structure of a display of a main device of FIG. 7, according to other embodiments.

FIG. 16 is a diagram illustrating generation of a layer according to an embodiment. Referring to FIG. 16, the main device 100 may classify various types of information or data according to an appropriate condition to display the various types of information or data on one screen, and generate layers representing the classified information or data. The information or data may be transmitted to the generated layers and then the layers may be hierarchically combined to form one screen and be output to the display 170. The screen may include at least one layer. Each of the at least one layer may be the same or different in size, location, etc. FIG. 16 illustrates that a layer A 1001, a layer B 1002, and a layer C 1003 are combined with one another, i.e., they are overlaid with one another, to finally form one screen on the display 170. Here, different data is displayed on the layers.

Figure 17A:
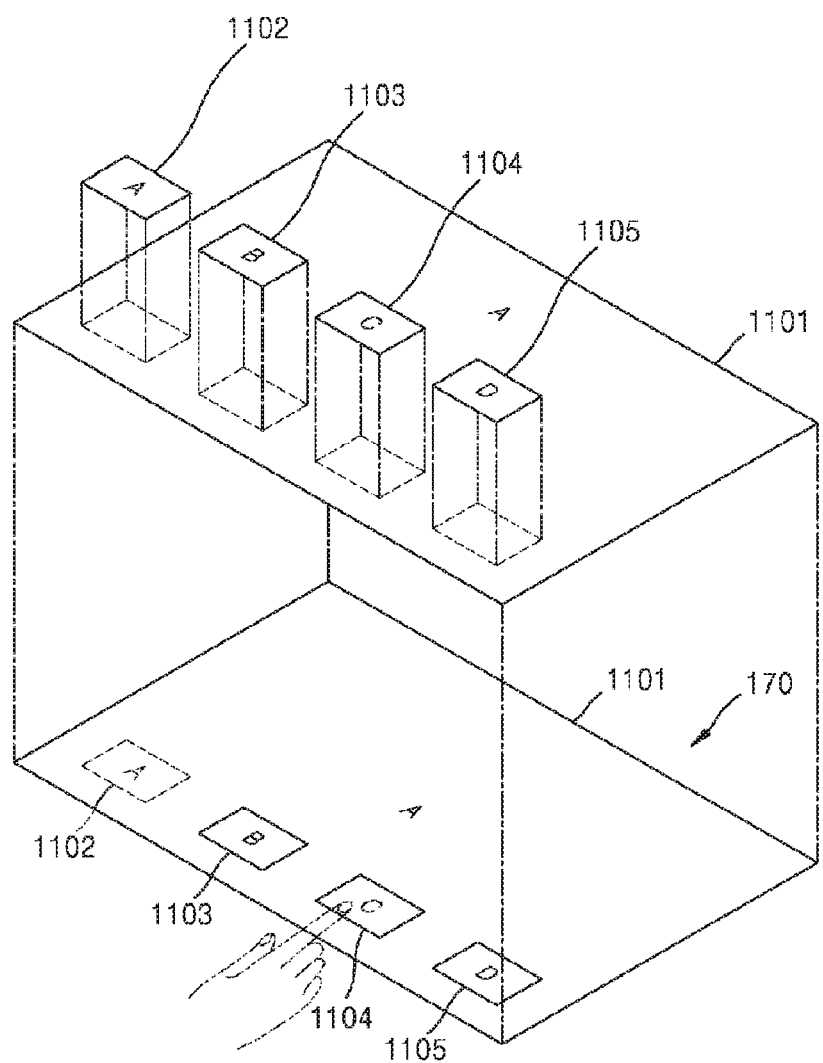
Figure 17B:
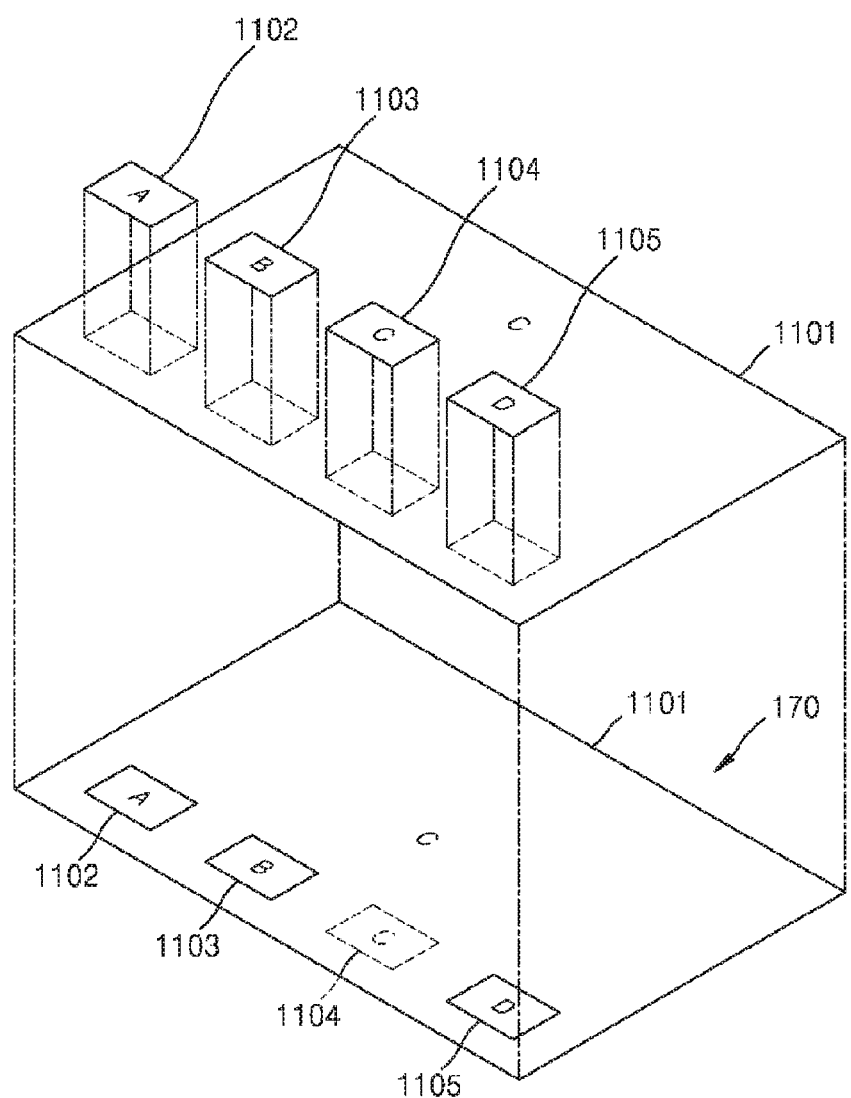

FIGS. 17A and 17B are diagrams schematically illustrating examples of a structure of the display 170 of the main device 100 of FIG. 7, according to other embodiments. Referring to FIGS. 16 and 17A, a layer generator 180-2 may generate a first layer 1101 and at least one from among second layers 1102, 1103, 1104, and 1105, to play and display on one screen a plurality of pieces of second video data including second video data captured by the main device 100 and one or more pieces of second video data received from the subdevice 200. One of the plurality of pieces of second video data may be transmitted to the first layer 1101. For example, second video data A captured by the main device 100 may be transmitted to the first layer 1101. The plurality of pieces of second data may be transmitted to the at least one from among the second layers 1102, 1103, 1104, and 1105. For example, the second video data A captured by the main device 100 and at least one piece of second video data, e.g., second video data B, C, and D, received from the subdevice 200 transmitting a connection permission signal may be transmitted to the at least one from among the second layers 1102, 1103, 1104, and 1105. Here, the number of the at least one from among the second layers 1102, 1103, 1104, and 1105 may be equal to the sum of the number of the first to $N^{th}$ devices 200-1 to 200-N transmitting the connection permission signal (i.e., 3 corresponding to the second video data B, C, and D) and the number of the main device 100 (i.e., 1 corresponding to the second video data A). The sum of the number of the first layer 1101 and the number of the at least one from among the second layers 1102 to 1105 may be greater by 1 than the sum of the number of the first to $N^{th}$ devices 200-1 to 200-N transmitting the connection permission signal and the number of the main device 100.

For example, when the embodiment shown in FIG. 10 is applied to the embodiment shown in FIG. 17A, the first video data A of the first photographer device is played and displayed on the first layer 1101, and the first video data A is played and displayed on the second surface 1102, the second video data B is played and displayed on the second surface 1103, the third video data C is played and displayed on the second surface 1104, And the fourth video data D may be reproduced and displayed on the surface 1105.

The display controller 185 may play and display the first layer 1101 (the second video data A) and the at least one from among the second layers 1102, 1103, 1104, and 1105 (the second video data A, B, C, and D) on one screen of the display 170 to be overlaid with each other through hierarchical combining, and may perform blocking on the second layer 1102 corresponding to the first layer 1101. Here, the performing of the blocking on the second layer 1102 may be understood as processing the second layer 1102 (the second video data A) corresponding to the first layer 1101 to be transparent so that a corresponding hidden portion of the first layer 1101 (the second video data A) may be visualized. Thus, as illustrated in FIG. 17A, the first layer 1101 (the second video data A) and the three second layers 1103, 1104, and 1105 (the second video data B, C, and D) are played and displayed on the display 170.

In an alternative embodiment, the display controller 185 may control a moving picture capturing state of the shooting unit 183 to be maintained when the first layer 1101 (the second video data A) and the at least one from among the second layers 1102, 1103, 1104, and 1105 (the second video data A, B, C, and D) are hierarchically combined to be overlaid with each other on one screen of the display 170.

Conventionally, when receiving one or more pieces of second video data from the subdevice 200, the main device 100 hardware-codes and displays the one or more pieces of the second video data. Thus, a video capturing function of the main device 100, i.e., an operation of a camera, should be stopped in this process. In contrast, in the present embodiment, the main device 100 does not additionally perform hardware coding but performs software coding, and generates a plurality of independent layers to play and display one or more pieces of second video data received from the subdevice 200. Accordingly, the video capturing function of the main device 100, i.e., the operation of the camera, may be maintained.

As described above, the main device 100 generates a plurality of layers, and the camera of the main device 100 is turned on to continuously capture a moving picture while one or more pieces of second video data from the subdevice 200 are reproduced and displayed. Thus, even if second video data cannot be received from the subdevice 200 due to an error occurring in the first communication network 300, second video data and first audio data captured by the main device 100 may be relayed in real time to the media platform 400 and thus be reproduced in real time at the media platform 400.

When a screen switch event signal regarding one of the at least one second layer is received, the layer switcher 180-3 may switch the second layer to the first layer and switch the first layer which has yet to be switched to the second layer. When a screen switch event signal regarding the first layer 1101 (the second video data A) and one (e.g., the second layer 1104 (the second video data C)) among the at least one second layer 1103, 1104, and 1105 (the second video data B, C, and D) played and displayed on the display 170 of the main device 100 is received as illustrated in FIG. 17A, the layer switcher 180-3 may switch the second layer 1104 (the second video data C) to the first layer 1101 (the second video data C) and switch the first layer 1101 (the second video data A) which has yet to be switched to the second layer 1102 (the second video data A) as illustrated in FIG. 17B.

The display controller 185 may synthesize, play and display the first layer 1101 (the second video data C) and the second layer 1102, 1103, and 1105 (the second video data A, B, and D) as one screen after performing switching through hierarchical combining, and perform blocking on the second layer 1104 (the second video data C) corresponding to the first layer 1101 (the second video data C).

The display controller 185 may control the second video data played and displayed on the first layer 1101 (indicated by reference numeral A in FIG. 17A or reference numeral C in FIG. 17B; hereinafter referred to as the "second video data A") to be transmitted in real time to the media platform 400. The second video data A played and displayed on the first layer 1101, and the second video data (indicated by reference numerals B, C, and D in FIG. 17A or reference numerals A, B, and D in FIG. 17B; hereinafter referred to as the second video data B, C, and D) played and displayed on the at least one second layer (indicated by reference numerals 1103, 1104, and 1105 in FIG. 17A or reference numerals 1102, 1103, and 1105 in FIG. 17B; hereinafter referred to as the at least one second layer 1103, 1104, and 1105) may be different in terms of frame rate. For example, the second video data A of 30 frames per second may be played and displayed on the first layer 1101, and the second video data B, C, and D of 15 frames per second may be played and displayed on the second layers 1103, 1104, and 1105. As illustrated in FIG. 17A, the second layers 1103, 1104, and 1105 included in one screen of the display 170 are smaller in size than the first layer 1101 and thus an error does not occur during the playing and displaying thereof even when the frame rates of the second layers 1103, 1104, and 1105 are lower than that of the first layer 1101.

Since the second video data B, C, and D received in real time from the first to $N^{th}$ devices 200-1 to 200-N are played and displayed on the second layers 1103, 1104, and 1105, the display controller 185 may control the main device 100 to play and display the second video data A of 30 frames per second on the first layer 1101 and control the first to $N^{th}$ devices 200-1 to 200-N to transmit the second video data B, C, and D of 15 frames per second as soon as a shooting start signal is transmitted to the first to $N^{th}$ devices 200-1 to 200-N. Accordingly, the second video data B, C, and D of 15 frames per second received from the first to $N^{th}$ devices 200-1 to 200-N may be played and displayed on the second layers 1103, 1104, and 1105.

The second video data A played and displayed on the first layer 1101 and the second video data B, C, and D played and displayed on the second layers 1103, 1104, and 1105 are different in frame rate in the present embodiment, but may be different in resolution. For example, the display controller 185 may display the second video data A having a resolution of 1280×720 on the first layer 1101 and may display second video data B, C, and D having a resolution of 640×480 on the second layers 1103, 1104, and 1105.

When a piece of second video data, e.g., the second video data C, among the second video data B, C, and D played and displayed on the second layers 1103, 1104, and 1105 is switched to the first layer 1101, the layer switcher 180-3 may transmit a control signal to one of the first to $N^{th}$ devices 200-1 to 200-N, which transmit the second video data C to the second layer 1104, to transmit the second video data C, the frame rate of which is changed. That is, a control signal instructing to transmit the second video data C having a frame rate of 30 frames per second may be transmitted to one of the first to $N^{th}$ devices 200-1 to 200-N transmitting the second video data C having a frame rate of 15 frames per second when a screen switch event signal is received.

Furthermore, when the second video data A played and displayed on the first layer 1101 is switched to the second layer 1102, the layer switcher 180-3 may output a control signal instructing to transmit the second video data A having a frame rate of 15 frames per second rather than the second video data A having a frame rate of 30 frames per second.

The inserter 187 may provide a user interface for inserting a watermark while the second video data A is played and displayed on the first layer 1101, and insert the watermark into the second video data A displayed on the first layer 1101 according to a user's selection. Here, the watermark may include various graphic elements such as an image, subtitles, a visual effect, etc.

The encoder 188 may encode the second video data A played and displayed on the first layer 1101 into the H.264 format and encode the first audio data through AAC. Here, even if only second video data is received from the subdevice 200 and displayed on the first layer 1101, the same shooting start signal is recorded on the main device 100 and the subdevice 200 and thus the second video data received from the subdevice 200 and the first audio data recorded by the main device 100 may be synchronous or almost synchronous with each other.

The transmitter 189 may transmit the encoded second video data displayed on the first layer 1101 and the encoded first audio data to the media platform 400 via the second communication network 500 using the RTMP. Thus, a moving picture (including the second video data and the first audio data) transmitted in real time from the main device 100 may be reproduced at the media platform 400.

Figure 18:
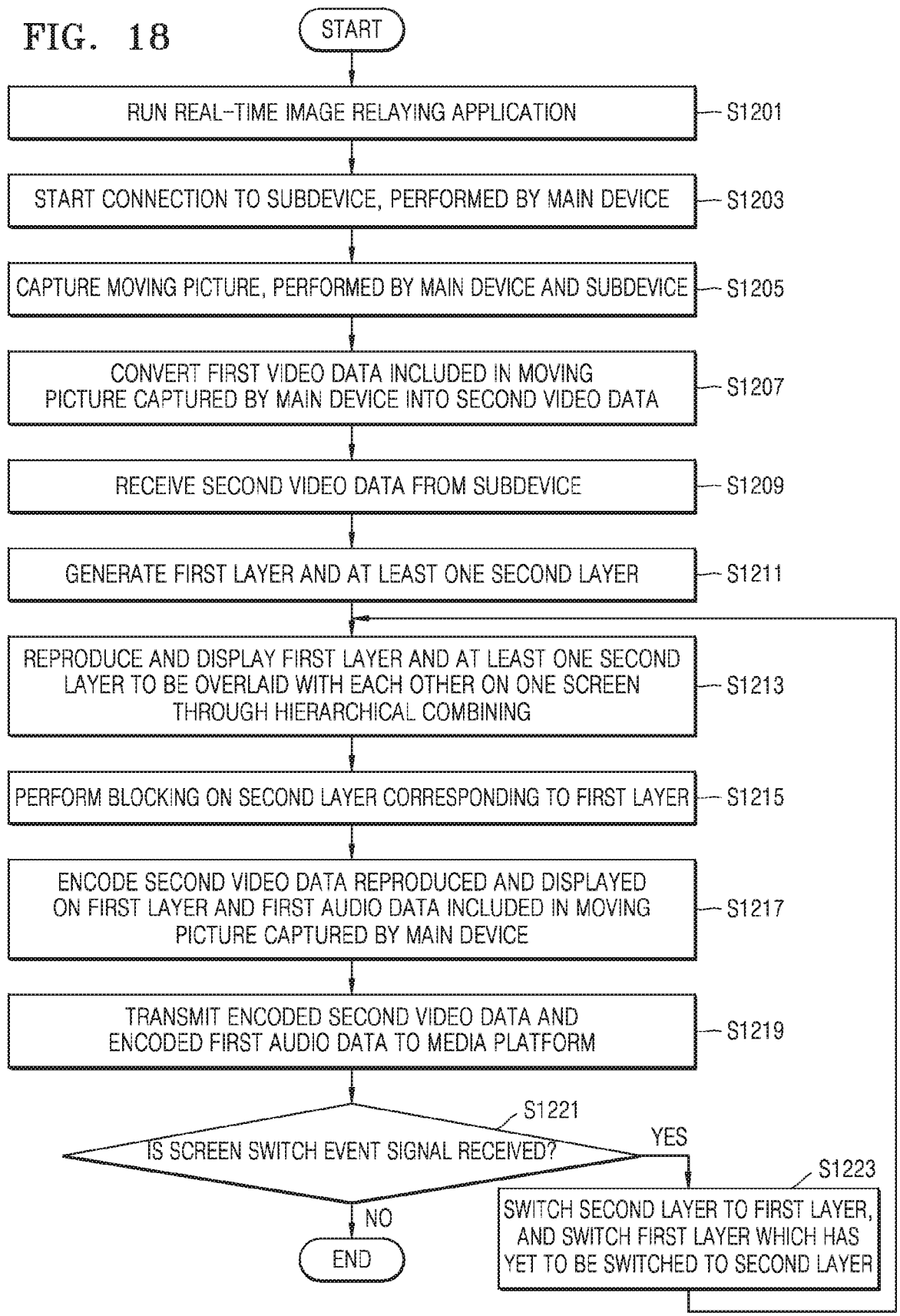
FIG. 18 is a flowchart of a method of processing an image, according to another embodiment.

FIG. 18 is a flowchart of a method of processing an image, according to another embodiment. Elements of FIG. 18 that are the same as those of FIGS. 7 to 17B are not redundantly described here. FIG. 18 illustrates an image processing method in which data is transmitted and received between the main device 100 and the subdevice 200 via the first communication network 300, the method being described below in terms of the main device 100.

Referring to FIG. 18, the main device 100 and the subdevice 200 run a real-time image relaying application according to a user's selection (operation S1201).

When the running of the real-time image relaying application is completed, the main device 100 starts connection to the subdevice 200 (operation S1203). A method of starting connection to the subdevice 200, performed by the main device 100, is the same as that described above with reference to FIG. 13 and is thus not described again here.

When shooting is started, each of the main device 100 and the subdevice 200 captures a moving picture in real time (operation S1205). The main device 100 may capture a moving picture (including first audio data and first video data) of a subject at a certain location in real time. The subdevice 200 may capture a moving picture (including first audio data and first video data) of the subject at one or more locations which are the same as or different from the location where the main device 100 captures the moving picture of the subject.

The main device 100 converts the first video data of the moving picture captured by the main device 100 itself into second video data (operation S1207).

The main device 100 receives second video data from the first to $N^{th}$ devices 200-1 to 200-N of the subdevice 200 which starts the capturing of the moving picture simultaneously with the capturing of the moving picture by the main device 100 (operation S1209).

The main device 100 generates a first layer and at least one second layer (operation S1211). In order to play and display on one screen a plurality of pieces of second data including the second video data captured by the main device 100 itself and one or more pieces of second video data received from the subdevice 200, the main device 100 may transmit one of the plurality of pieces of second data to the first layer and transmit the plurality of pieces of second data to the at least one second layer.

The main device 100 reproduces and displays the first layer and the at least one second layer by hierarchically combining them to be overlaid with each other on the screen (operation S1213). Here, the main device 100 may control a moving picture capturing state of the shooting unit 183 to be maintained when the first layer and the at least one second layer are played and displayed to be overlaid with each other on one screen of the display through hierarchical combining.

The main device 100 performs blocking on the second layer corresponding to the first layer on the screen on which reproduction and displaying are being performed (operation S1215).

The main device 100 encodes the second video data displayed on the first layer into the H.264 format, and encodes the first audio data of the moving picture captured by the main device 100 through AAC (operation S1217). Here, even if only the second video data is received from the subdevice 200 and displayed on the first layer, the same shooting start signal is recorded on the main device 100 and the subdevice 200. Thus, the second video data received from the subdevice 200 and the first audio data recorded by the main device 100 may be synchronous or almost synchronous with each other.

The main device 100 transmits the encoded second video data displayed on the first layer and the encoded first audio data to the media platform 400 via the second communication network 500 by using the RTMP (operation S1219).

Thus, the moving picture (including the second video data and the first audio data) transmitted in real time from the main device 100 may be reproduced at the media platform 400.

The main device 100 determines whether a screen switch event signal regarding the first layer and one of the at least one second layer played and displayed on the display 170 of the main device 100 is received (operation S1221).

When the main device 100 receives the screen switch event signal, the second layer is switched to the first layer and the first layer which has yet to be switched is switched to the second layer (operation S1223). Thereafter, the main device 100 may synthesize, play and display the first layer and the at least one second layer as one screen after performing switching through hierarchical combining, and perform blocking the second layer corresponding to the first layer after performing switching.

According to one or more of the above embodiments, video data and audio data captured by multiple devices may be transmitted to a media platform in real time without delay and thus the video data and the audio data can be reproduced at the media platform in real time.

A video signal captured by a subdevice among the multiple devices may be transmitted to a main device without delay and without using a router, and the main device may relay video data and audio data to the media platform in real time and the video data and the audio data in real time can be reproduced in real time at the media platform.

Video signals captured by the main device and the subdevice may be displayed on a display region of the main device in real time to quickly determine video data to be transmitted to the media platform. Thus, the video data and audio data can be reproduced at the media platform in real time.

In addition, a camera of the main device may be turned on to continuously capture a moving picture and thus video data and audio data captured by the main device may be relayed in real time to the media platform even when video data cannot be received due to an error occurring in a communication network main device. Accordingly, the video data and the audio data can be reproduced in real time on the media platform.

Effects of the inventive concept are not, however, limited to the above effects and other effects would be apparent to those of ordinary skill in the art from the above description.

The embodiments according to the present invention described above may be implemented in the form of program instructions that may be executed through various computer components and recorded on a computer-readable recording medium. The computer-readable recording medium may include program instructions, data files, data structures, and the like individually or in combination. The program instructions recorded on the medium may be specifically designed for the present invention or may be well known to one of ordinary skill in the art of software. Examples of the computer-readable recording medium include a magnetic medium such as a hard disk, a floppy disk, or a magnetic tape, an optical medium such as a compact disc read-only memory (CD-ROM) or a digital versatile disc (DVD), a magneto-optical medium such as a floptical disk, and a hardware device such as a ROM, a random access memory (RAM), or a flash memory that is specially designed to store and execute program instructions. Examples of the program instructions include not only machine code generated by a compiler or the like but also high-level language codes that may be executed by a computer using an interpreter or the like. The hardware device may be configured to operate as one or more software modules in order to perform operations of the present invention, and vice versa.

According to the present invention, it is possible to produce relay broadcasting content without performing a process that requires many computing resources for video data or audio data. Accordingly, a general user who has only a mobile device that may access typical wireless communication networks (e.g., a mobile communication network such as 3G or LTE, or a short-range communication network such as Wi-Fi, Wi-Fi Direct, and LTE Direct) can easily produce relay broadcasting content.

Also, according to the present invention, a user can make various editing effects while not being significantly affected by performance of equipment.

Also, according to the present invention, video data and audio data generated by a plurality of photographer devices may be directly sampled and synchronized by a corresponding photographer device, and quality (e.g., a sampling rate, a resolution, a data size) of sampling data may be adaptively determined on the basis of whether corresponding sampling data is to be edited. Thus, it is possible to reduce a computing load of a relay device by distributing a computing load required to produce relay broadcasting content to a plurality of photographer devices and thus widen the range of photographer devices that may participate in relay broadcasting.

Although the present invention has been described with reference to the specific embodiments and drawings together with specific details such as detailed components, the embodiments are provided only for better understanding of the present invention, and thus the present invention is not limited thereto. Also, it should be apparent to those skilled in the art that various modifications and variations may be made from the above description.

Therefore, the spirit of the present invention is not be restricted or limited to the above-described embodiments, but is determined by the following claims and their equivalents.

What is claimed is:

1. A method of supporting relay broadcasting using a mobile device, which is performed by a relay device, the method comprising:

receiving first sampling video data and first sampling audio data of first video data and first audio data, respectively, generated by a first photographer device and receiving second sampling video data and second sampling audio data of second video data and second audio data, respectively, generated by a second photographer device;

providing at least one of the first sampling video data, the first sampling audio data, the second sampling video data, and the second sampling audio data to the relay device; and generating editing data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data, wherein the generating editing data for editing relay broadcasting content comprises:

generating a first layer and at least one second layer to play and display on a screen the first sampling video data and the second sampling video data, wherein the first layer is configured to transmit the first sampling video data to the screen, and the at least one second layer is configured to transmit the first sampling video data and the second sampling video data to a part of the screen; and controlling to play and display the first layer and the at least one second layer to be overlaid with each other on the screen through hierarchical combining.

2. The method of claim 1, wherein the first photographer device and the second photographer device are physically included in one device.

3. The method of claim 1, wherein:

quality of at least one of the first sampling video data, the first sampling audio data, the second sampling video data, and the second sampling audio data, which is transmitted from the first photographer device or the second photographer device and then received by the relay device, is adaptively determined based on an editing input;

a control signal for adaptively determining the quality is transmitted from the relay device to the first photographer device or the second photographer device;

quality of data to be edited is determined to be higher than quality of data not to be edited; and quality of specific data to be edited is determined to be higher than quality of the specific data before or after it is determined that the specific data is to be edited.

4. The method of claim 1, further switching the at least one second layer to the first layer and switch the first layer which has yet to be switched to the at least one second layer, when a screen switch event signal regarding one of the at least one second layer is received.

5. A device for supporting relay broadcasting using a mobile device, the device comprising:

a data receiver configured to receive first sampling video data and first sampling audio data of first video data and first audio data, respectively, generated by a first photographer device and receive second sampling video data and second sampling audio data of second video data and second audio data, respectively, generated by a second photographer device;

a relay broadcasting content editing processor configured to provide at least one of the first sampling video data, the first sampling audio data, the second sampling video data, and the second sampling audio data to a relay device and generate data for editing relay broadcasting content including at least one of the first sampling video data, the first sampling audio data, the second sampling video data, and the second sampling audio data with reference to an input of a repeater for editing at least one of the first sampling video data, the first sampling audio data, the second sampling video data, and the second sampling audio data;

a layer generating processor configured to generate a first layer and at least one second layer to play and display on a screen the first sampling video data and the second sampling video data, wherein the first layer is configured to transmit the first sampling video data to the screen, and the at least one second layer is configured to transmit the first sampling video data and the second sampling video data to a part of the screen; and a display controlling processor configured to play and display the first layer and the at least one second layer to be overlaid with each other on the screen through hierarchical combining.

\* \* \* \* \*